(12) United States Patent
Yoshida

(10) Patent No.: US 10,025,537 B2
(45) Date of Patent: Jul. 17, 2018

(54) INFORMATION PROCESSING APPARATUS HAVING COMBINED MODEL COMMON FUNCTION FILE AND MODEL SPECIFIC FUNCTION FILE, INFORMATION PROCESSING SYSTEM, INFORMATION PROCESSING METHOD, AND RECORDING MEDIUM

(71) Applicant: Yuuichi Yoshida, Kanagawa (JP)

(72) Inventor: Yuuichi Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/651,263

(22) Filed: Jul. 17, 2017

(65) Prior Publication Data

US 2018/0024783 A1    Jan. 25, 2018

(30) Foreign Application Priority Data

Jul. 21, 2016  (JP) .................................. 2016-143653
Nov. 4, 2016  (JP) .................................. 2016-216670

(51) Int. Cl.
*G06K 15/00* (2006.01)
*G06F 3/12* (2006.01)
*H04L 29/08* (2006.01)

(52) U.S. Cl.
CPC .......... *G06F 3/1203* (2013.01); *G06F 3/1206* (2013.01); *G06F 3/1228* (2013.01); *G06F 3/1232* (2013.01); *G06F 3/126* (2013.01); *G06F 3/1285* (2013.01); *H04L 67/16* (2013.01)

(58) Field of Classification Search
USPC ................................ 358/1.1–3.29, 1.11–1.18
See application file for complete search history.

(56) References Cited

U.S. PATENT DOCUMENTS

| 2006/0082802 A1* | 4/2006 | Furuya ................... G06F 3/1206 358/1.13 |
| 2008/0068635 A1* | 3/2008 | Asano .................... G06F 3/1204 358/1.13 |
| 2009/0251713 A1* | 10/2009 | Funane .............. H04N 1/00344 358/1.9 |
| 2009/0303515 A1* | 12/2009 | Imai ....................... G06F 3/1204 358/1.13 |

(Continued)

FOREIGN PATENT DOCUMENTS

| JP | 2008-097573 | 4/2008 |
| JP | 2015-225481 | 12/2015 |
| JP | 2016-057743 | 4/2016 |

*Primary Examiner* — Marcellus Augustin
(74) *Attorney, Agent, or Firm* — Harness, Dickey & Pierce P.L.C.

(57) ABSTRACT

An information processing apparatus includes circuitry that reads, from a first memory, a model common function file defining one or more common functions that are common to a majority of a plurality of models of an image forming apparatus and one or more setting items corresponding to the common function, and one or more model specific function file defining a function specific to one of the plurality of models of the image forming apparatus and setting items corresponding to the model specific function; and combines the model common function file with the model specific function file to generate a combined function file.

11 Claims, 24 Drawing Sheets

(56) References Cited

U.S. PATENT DOCUMENTS

| | | | |
|---|---|---|---|
| 2012/0044534 A1* | 2/2012 | Ichikawa | G06F 3/1204 358/1.15 |
| 2012/0268783 A1* | 10/2012 | Nakahara | G06K 15/1805 358/1.15 |
| 2013/0163041 A1* | 6/2013 | Sato | G06K 15/1805 358/1.15 |
| 2013/0286431 A1* | 10/2013 | Kise | G06F 3/1296 358/1.15 |

\* cited by examiner

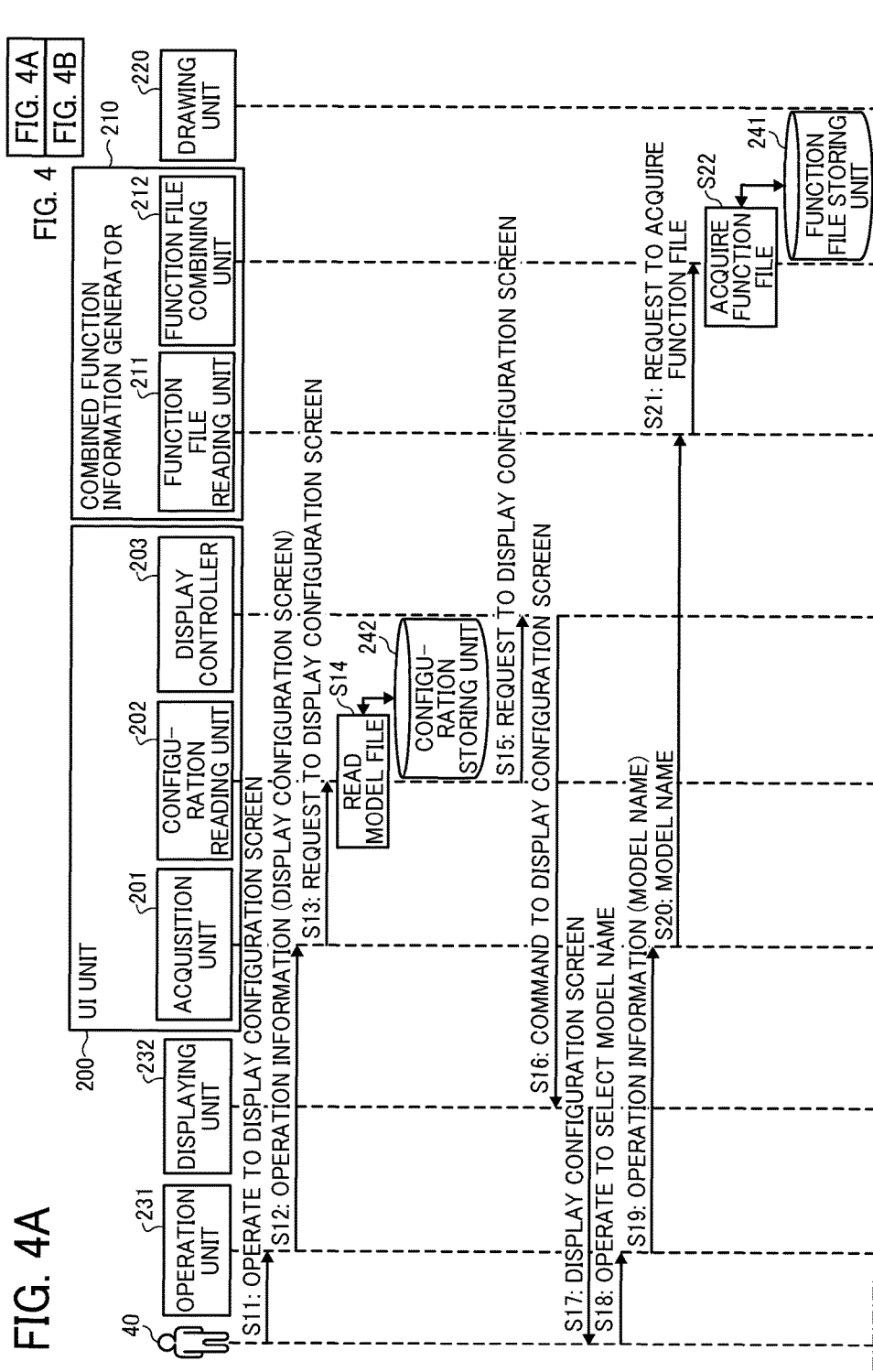

FIG. 8

```
<machine name="Common Model">  ~701

<function name="Collate">  ~702
        <selection name="on"/>
        <selection name="off"/>
    </function>

<function name="Color Mode">  ~703
        <selection name="Mono"/>
    </function>

(NO DESCRIPTION)  ~704

<function name="User Name">  ~705
        <range min="0" max="10"/>  ~706
    </function>

<function name="Page Size">  ~707
        <selection name="A4"/>
        <selection name="Letter"/>
        <selection name="Postcard"/>  ~708
    </function>

<function name="Duplex">  ~709
        <selection name="on"/>
        <selection name="off"/>
    </function>

</machine>
```

```
<machine name="PrinterA">

<function name="Collate">          ~901
      <selection name="on"/>
      <selection name="off"/>
  </function>

<function name="Color Mode">       ~902      ADDED
      <selection name="Mono"/>
      <selection name="Full Color"/>
  </function>

<function name="Staple">           ~903
      <selection name="on"/>
      <selection name="off"/>
  </function>
                                              OVER-
                                              WRITTEN
  <function name="User Name">        ~904
      <range min="0" max="25"/>      ~905
  </function>
                                              DELETED
  <function name="Page Size">        ~906
      <selection name="A4"/>
      <selection name="Letter"/>
  </function>

(NO DESCRIPTION)                                    --907

</machine>
```

900

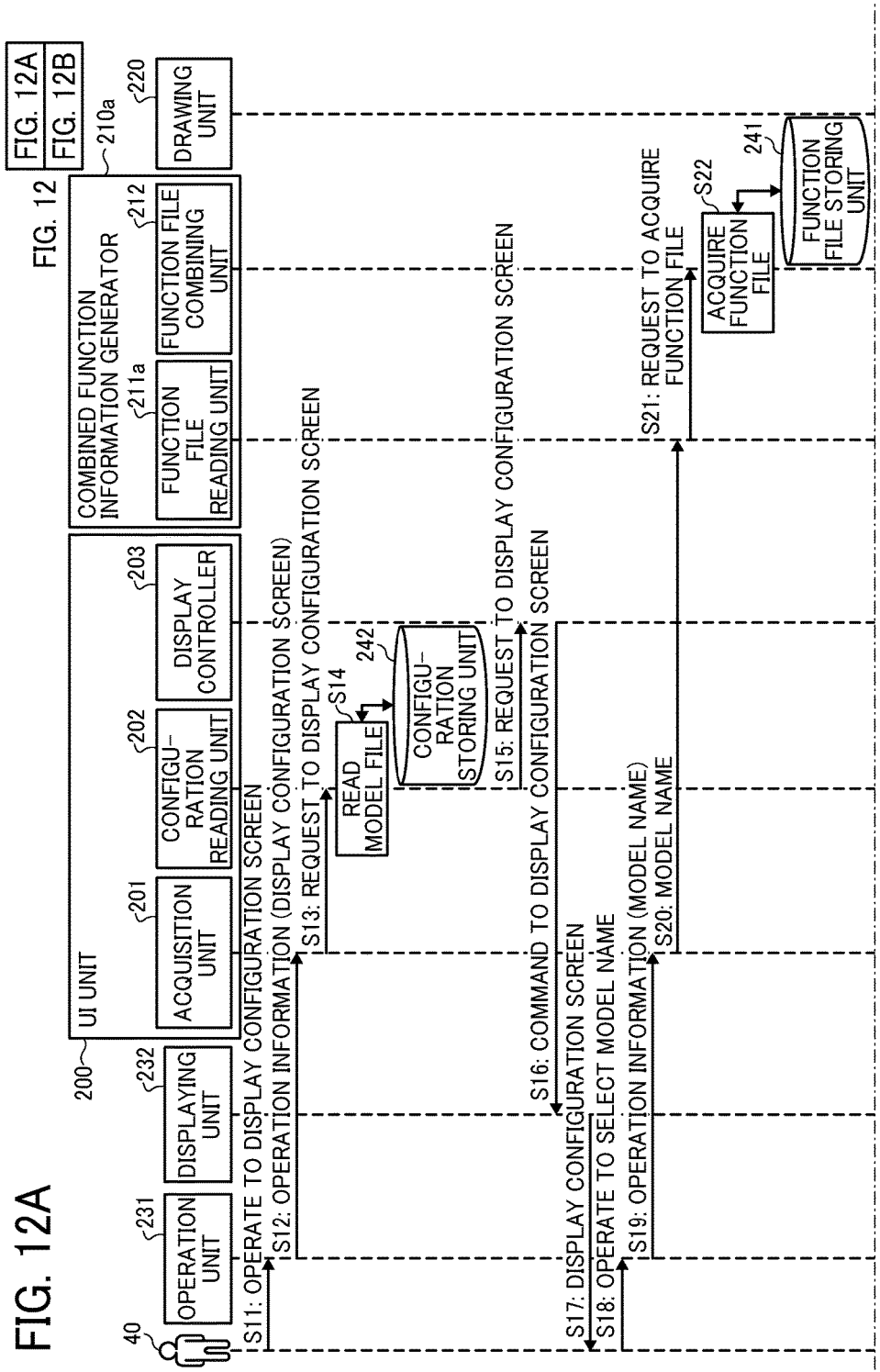

FIG. 13

PAPER SIZE

| A4 ▼ |
| A2 |
| A4 |
| Letter |
| A3 |
| A5 |
| B1 |
| B2 |
| B3 |
| B4 |
| B5 |
| Half Letter |
| ⋮ |

| FUNCTION NAME | function name | selection name |
|---|---|---|
| COLOR MODE | Color Mode | Full Color<br>Mono<br>Two Toners |
| PAPER FEEDING TRAY | Input Bin | Auto<br>Tray1<br>Tray2<br>Tray3<br>Tray4<br>Tray5<br>Bypass Tray |
| PAPER TYPE | Media Type | Standard<br>Glossy<br>Transparency<br>Middle Thick<br>Thick1<br>Thick2<br>Recycle |
| PAPER SIZE | Page Size | A2<br>A4<br>Letter<br>A3<br>A5<br>B1<br>B2<br>B3<br>B4<br>B5<br>Half Letter<br>12*11<br>9*11 |
| RESOLUTION | Resolution | 200*200<br>300*300<br>400*400<br>600*600<br>600*1200<br>1200*1200 |
| DUPLEX | Duplex | on<br>off |

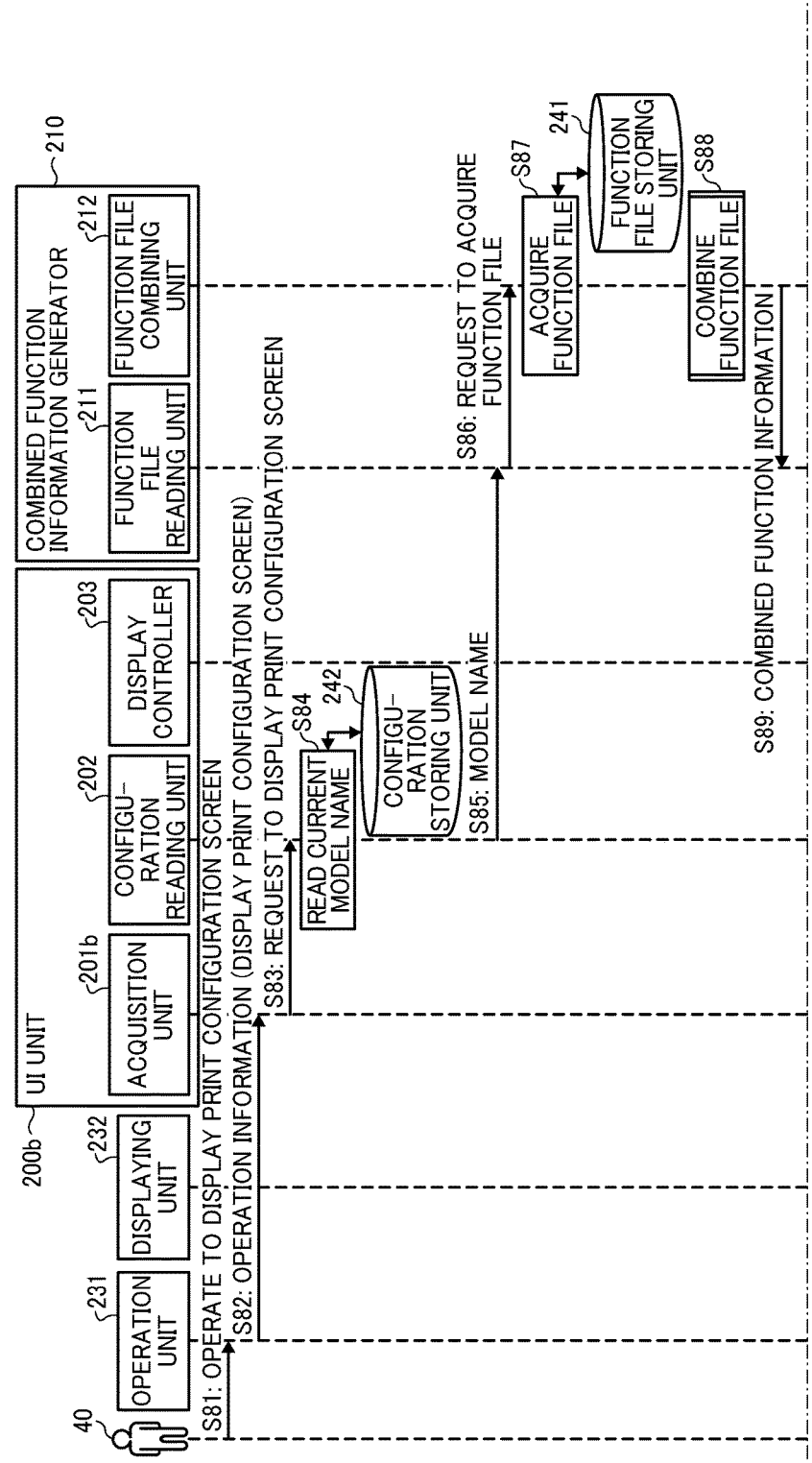

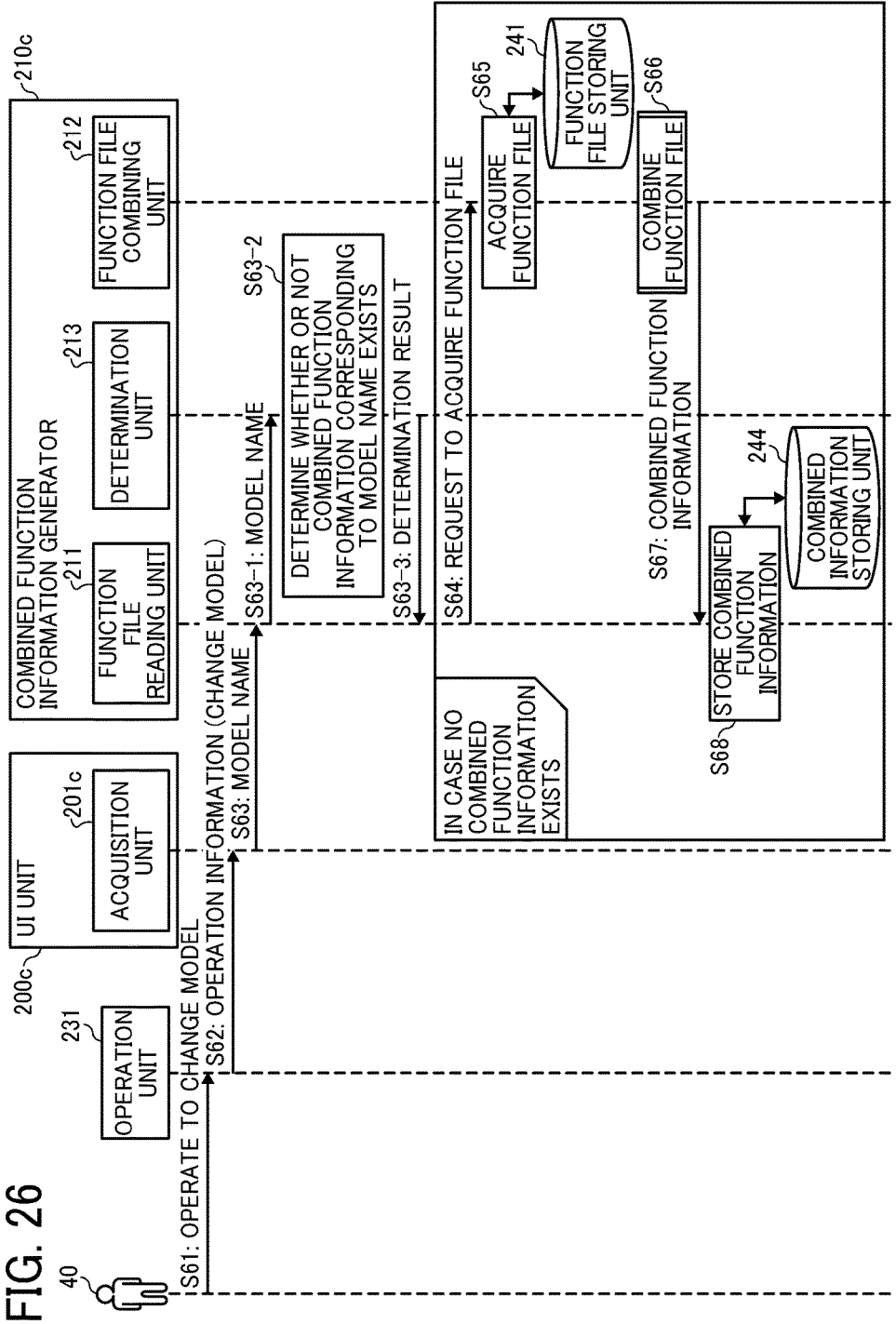

INFORMATION PROCESSING APPARATUS HAVING COMBINED MODEL COMMON FUNCTION FILE AND MODEL SPECIFIC FUNCTION FILE, INFORMATION PROCESSING SYSTEM, INFORMATION PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Applications No. 2016-143653, filed on Jul. 21, 2016 and No. 2016-216670, filed on Nov. 4, 2016 in the Japan Patent Office, the entire disclosure of which is hereby incorporated by reference herein.

BACKGROUND

Technical Field

The present invention relates to an information processing apparatus, an information processing system, an information processing method, and a non-transitory recording medium storing an information processing program.

Background Art

A technology that provides universal printer drivers that can modify available functions in accordance with connected apparatuses such as printers is known. The universal printer drivers may support multiple printer models, modify functions compatible with the printer model by communicating with the connected printer bi-directionally, and allow users to select the connected printer among a list of printer models displayed on a printer property screen of a personal computer (PC). To implement those functions, for each supported printer model, the universal printer drivers store function files defining available functions for the printer model. Based on the function defined in the function file, a printer configuration screen is displayed. An example of the universal printer driver described above is a V4 driver. In the V4 driver, by using a XML Paper Specification (XPS) print path, data is transferred in a data format of XPS.

As an example of a technology that uses the driver utilizing the function file for each printer model, regarding an information processing apparatus that acquires configuration information of a connected apparatus from the connected apparatus and may configure settings in accordance with the connected apparatus based on the configuration information processing apparatus, a technology that includes a function file storing unit that stores the function file describing the function in the connected apparatus, an apparatus sorting and reading unit that sorts apparatuses based on the configuration information acquired from the apparatus and reads the function file in accordance with the sort result from the function file storing unit, an information acquisition unit that acquires information regarding the function described in the function file read by the apparatus sorting and reading unit, and a display unit that displays a configuration screen for configuring predetermined settings regarding the apparatus based on the information acquired by the information acquisition unit is known.

SUMMARY

Example embodiments of the present invention provide a novel information processing apparatus that includes circuitry that reads, from a first memory, a model common function file defining one or more common functions that are common to a majority of a plurality of models of an image forming apparatus and one or more setting items corresponding to the common function, and one or more model specific function file defining a function specific to one of the plurality of models of the image forming apparatus and setting items corresponding to the model specific function; and combines the model common function file with the model specific function file to generate a combined function file.

Further example embodiments of the present invention provide a method of processing an image and a non-transitory recording medium storing an information processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 4A and 4B are sequence charts illustrating an operation of displaying a printer configuration screen on the client as an embodiment of the present invention;

FIG. 8 is a diagram illustrating an example of the model common function file as an embodiment of the present invention;

FIG. 10 is a diagram illustrating an example of a combined function file as an embodiment of the present invention;

FIGS. 12A and 12B are sequence charts illustrating an operation of displaying a printer configuration screen on the client as an embodiment of the present invention;

FIG. 13 is a diagram illustrating a status that items selectable in a specific function are laid out in a predetermined displaying order as an embodiment of the present invention;

FIG. 14 is a diagram illustrating a displaying order table as an embodiment of the present invention;

FIGS. 20A and 20B are sequence charts illustrating an operation of displaying a print configuration screen on the client as an embodiment of the present invention;

FIG. 26 is a sequence chart illustrating an operation of changing a model on the property screen performed by the client as an embodiment of the present invention.

Figure 1:
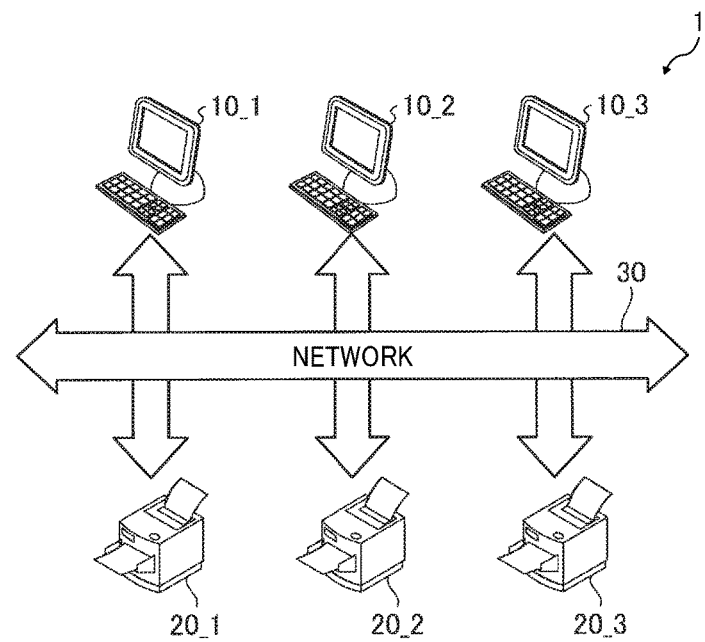
FIG. 1 is a diagram illustrating an entire configuration of the information processing system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Exemplary embodiments of this disclosure are now described below with reference to the accompanying drawings.

Embodiment 1

FIG. 1 is a diagram illustrating a configuration of the information processing system in this embodiment. Descriptions are given below of the entire configuration of the information processing system 1 according to the present embodiment with reference to FIG. 1.

As illustrated in FIG. 1, the information processing system 1 includes clients 10_1 to 10_3 and printers 20_1 to 20_3. The clients 10_1 to 10_3 may communicate with the printers 20_1 to 20_3 via a network 30. In FIG. 1, the information processing system 1 includes three clients 10_1 to 10_3 and three printers 20_1 to 20_3. However, the configuration of the information processing system 1 is not limited to that, and there may be any number of clients and printers. Hereinafter, in case of referring to an arbitrary client or referring to clients collectively, the clients 10_1 to 10_3 are simply referred to as "client 10". Similarly, in case of referring to an arbitrary printer or referring to printers collectively, the printers 20_1 to 20_3 are simply referred to as "printer 20".

The client 10 is an information processing apparatus such as a personal computer (PC) etc. that converts print data (print information) into data (converted information) written in Page Description Language (PDL) and transfers the PDL data to the printer 20 via the network 30 to request to print. In addition, as described later, in the client 10, a model common driver as a printer driver for controlling the printer 20 is installed.

The printer 20 is an image forming apparatus that receives the PDL data via the network 30 and prints an image based on the PDL data (forms an image). It should be noted that the printer 20 is an example of an image forming apparatus that includes at least a print function. For example, the printer 20 may be a multifunction peripheral (MFP) that includes at least two functions among a copy function, print function, scan function (scanner function), and facsimile function.

For example, the network 30 is a network such as a local area network (LAN), wide area network (WAN), a dedicated network, and the Internet etc. For example, data communication is performed on the network 30 using communication protocols such as Transmission Control Protocol/Internet Protocol (TCP/IP) etc.

Figure 2:
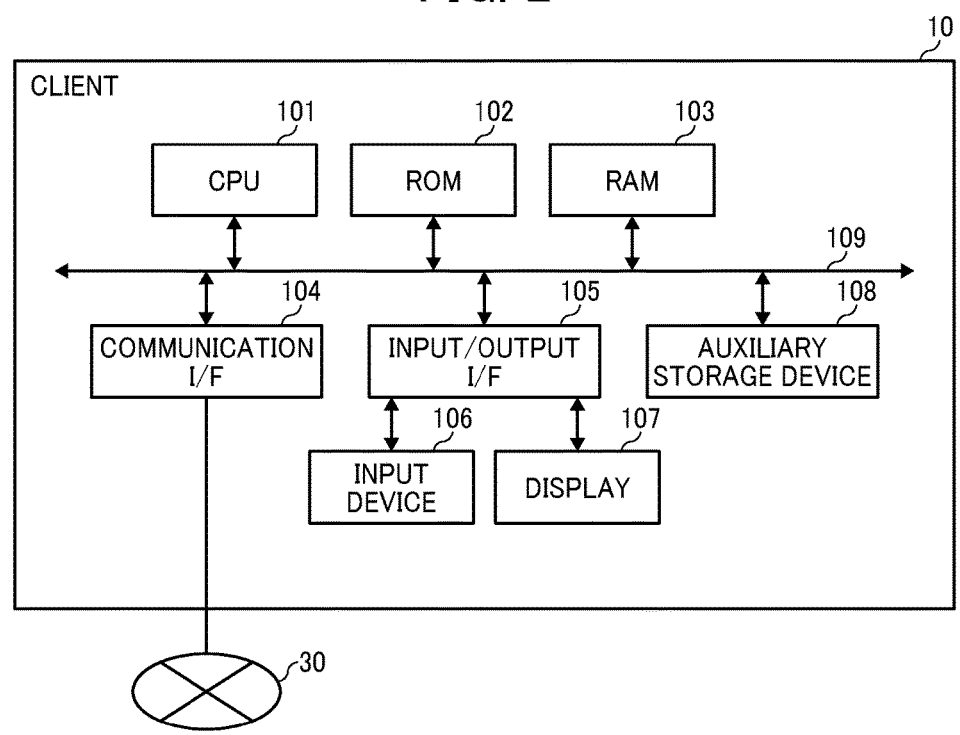
FIG. 2 is a block diagram illustrating a hardware configuration of a client as an embodiment of the present invention.

FIG. 2 is a block diagram illustrating a hardware configuration of a client in this embodiment. A hardware configuration of the client 10 in this embodiment is described below with reference to FIG. 2.

As illustrated in FIG. 2, the client 10 includes a central processing unit (CPU) 101, a read only memory (ROM) 102, a random access memory (RAM) 103, a communication interface (I/F) 104, an input/output I/F 105, an input device 106, a display 107, and an auxiliary storage device 108.

The CPU 101 controls the entire client 10. The ROM 102 is a nonvolatile storage device that stores programs such as firmware of the client 10 etc. The RAM 103 is a volatile storage device mainly used as a work area in which the CPU 101 executes a program.

The communication I/F 104 is an interface such as a network interface card (NIC) etc. for performing data communication via the network 30. For example, the communication I/F 104 performs data communication using communication protocols such as TCP/IP etc.

The input/output I/F 105 is an interface for connecting various devices (such as the input device 106 and the display 107) to the bus 109.

The input device 106 is an input device such as a keyboard and a mouse etc. for inputting text and numerals, selecting various commands, and moving a cursor etc.

The display 107 is a display device such as a liquid crystal display, plasma display, and organic electro-luminescence (EL) display etc. for displaying various information such as a cursor, menu, window, text, and image etc.

The auxiliary storage device 108 is a storage device such as a hard disk drive (HDD) and a solid state drive (SSD) etc. for storing an operating system (OS), application program, and various data. In this embodiment, the auxiliary storage device 108 is included in the client 10. However, the configuration is not limited to that. For example, the auxiliary storage device 108 may be a storage device located outside the client 10 or a storage device included in a server apparatus communicably connected to the client 10.

The CPU 101, ROM 102, RAM 103, communication I/F 104, input/output I/F 105, and auxiliary storage device 108 are communicably connected with each other via a bus 109 such as an address bus and data bus etc.

Figure 3:
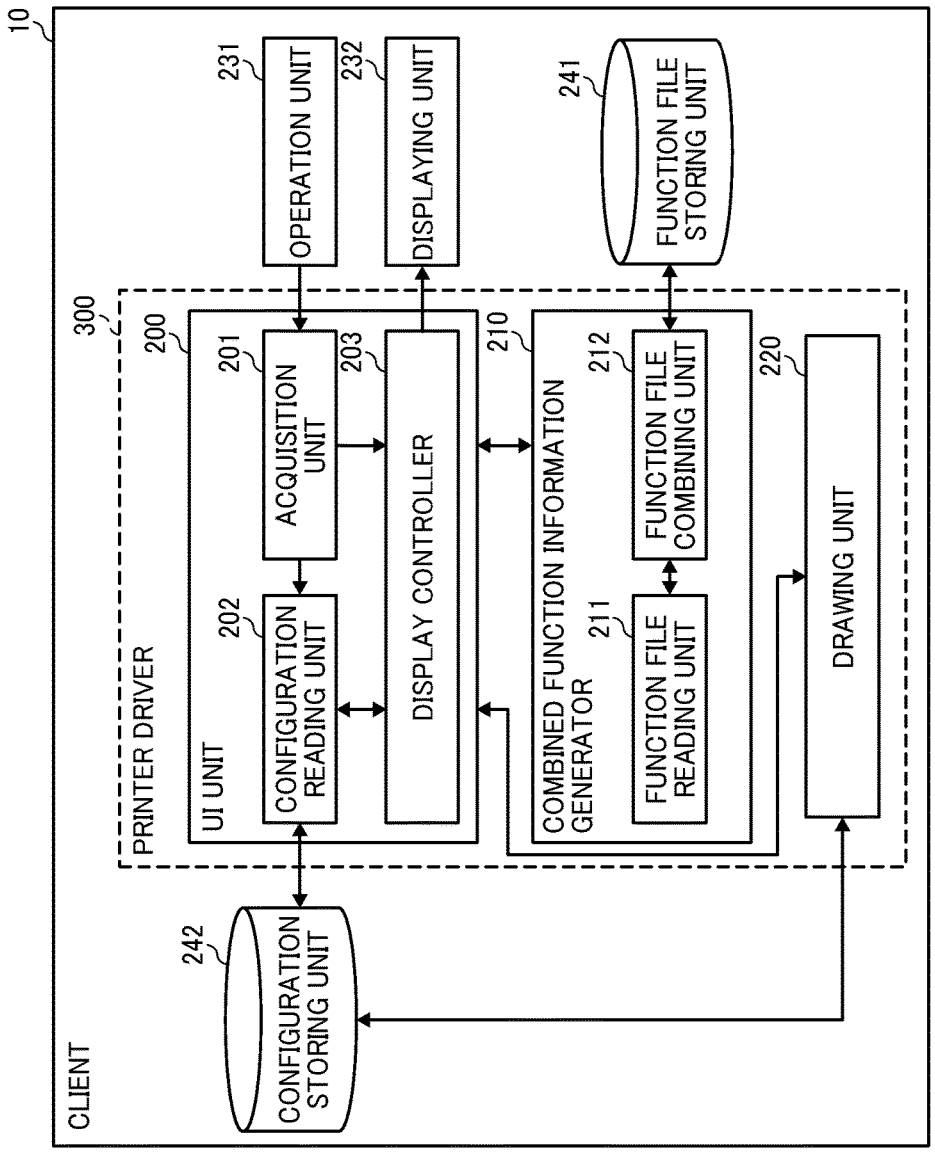
FIG. 3 is a block diagram illustrating a functional configuration of a client as an embodiment of the present invention.

FIG. 3 is a block diagram illustrating a functional configuration of the client in this embodiment. A functional configuration of the client 10 in this embodiment is described below with reference to FIG. 3.

As illustrated in FIG. 3, a printer driver 300 as a model common driver is installed in the client 10 as described above. Furthermore, the client 10 includes an operation unit 231, a displaying unit (display unit) 232, a function file storing unit 241 (a first storing unit), and a configuration storing unit 242. As illustrated in FIG. 3, by executing by the CPU 101, functional units such as a user interface (UI) unit 200, a combined function information generator 210, and a drawing unit 220 are implemented in the printer driver 300. In addition, the printer driver 300 includes function files defining functions included in a printer (such as a model common function file and a model specific function file as described later) as a package.

The UI unit 200 is a functional unit that displays a configuration screen for printing and acquiring operation information input on the configuration screen using the operation unit 231. The UI unit 200 includes an acquisition unit 201, a configuration reading unit 202, and a display controller 203.

The acquisition unit 201 is a functional unit that acquires (receives) operation information input on the operation unit 231 by user operation. For example, the acquisition unit 201 is implemented by a program (i.e., the printer driver 300) executed by the CPU 101 in FIG. 2.

The configuration reading unit 202 reads a model file as a file listing models of each printer 20 connected to the network 30 from the configuration storing unit 242 and transfers a request to display a configuration screen along with the model file to the display controller 203. The model file is described later. For example, the configuration reading unit 202 is implemented by the CPU 101 executing a program (i.e., the printer driver 300) in FIG. 2.

The display controller 203 is a functional unit for controlling a displaying operation of the displaying unit 232. For example, the display controller 203 is implemented by a program (i.e., the printer driver 300) executed by the CPU 101 in FIG. 2.

The combined function information generator 210 is a functional unit for generating a combined function file by combining a model specific function file defining functions specific to the model of each printer 20 with a model common function file defining functions that most printers include in common. The combined function information generator 210 includes a function file reading unit 211 (a reading unit) and a function file combining unit 212 (a combining unit). The operation of combining the combined function file is described later with reference to FIGS. 4 and 7 etc.

The function file reading unit 211 is a functional unit that transfers a request to acquire a function file corresponding to the model name selected by user operation to the function file combining unit 212. For example, the function file reading unit 211 is implemented by a program (i.e., the printer driver 300) executed by the CPU 101 in FIG. 2.

The function file combining unit 212 is a functional unit that combines the model specific function file with the model common function file to generate the combined function file. For example, the function file combining unit 212 is implemented by a program (i.e., the printer driver 300) executed by the CPU 101 in FIG. 2.

The drawing unit 220 is a functional unit that reads combined function information merging the combined function file into print configuration information from the configuration storing unit 242 using the function file reading unit 211 and converts intermediate data of the print data (e.g., XPS format data in case of the V4 driver) into PDL data reflecting the content of the combined function information.

The operation unit 231 is a functional unit that inputs operations such as inputting text and numerals, selecting various commands, and moving cursor etc. by user operation. The operation unit 231 is implemented by the input device 106 in FIG. 2.

The displaying unit 232 is a functional unit that displays various information such as cursor, menu, window, text, and image etc. under control of the display controller 203. The displaying unit 232 is implemented by the display 107 in FIG. 2.

The function file storing unit 241 is a functional unit that stores the model specific function file and the model common function file. For example, the function file storing unit 241 is implemented by the auxiliary storage device 108 in FIG. 2.

The configuration storing unit 242 is a functional unit that stores the combined function information including at least the combined function file combining the model specific function file with the model common function file by the function file combining unit 212. For example, the configuration storing unit 242 is implemented by the auxiliary storage device 108 in FIG. 2.

In the above description, the acquisition unit 201, the configuration reading unit 202, the display controller 203, the function file reading unit 211, the function file combining unit 212, and the drawing unit 220 are implemented by programs as software. However, the acquisition unit 201, the configuration reading unit 202, the display controller 203, the function file reading unit 211, the function file combining unit 212, and the drawing unit 220 may also be implemented by hardware circuitry such as Field Programmable, Gate Array (FPGA) and Application Specific integrated Circuit (ASIC) etc.

In addition, the functional units in FIG. 3 are functions illustrated conceptually, and configurations of the functional units in FIG. 3 are not limited to that. For example, multiple functional units separately illustrated in FIG. 3 may be implemented as one functional unit. By contrast, functions included in one functional unit in FIG. 3 may be divided into multiple functions and implemented as multiple functional units. In addition, in this embodiment, functional units implemented by the printer driver 300 in FIG. 3 are implemented by executing one program as software. However, the configuration of those functional units is not limited to that, and those functional units may be implemented by executing multiple software programs. For example, among functional units included in the printer driver 300, the UI unit 200 and the combined function information generator 210 may be implemented separately from the drawing unit 220 by executing separate software programs respectively.

Figure 4B:
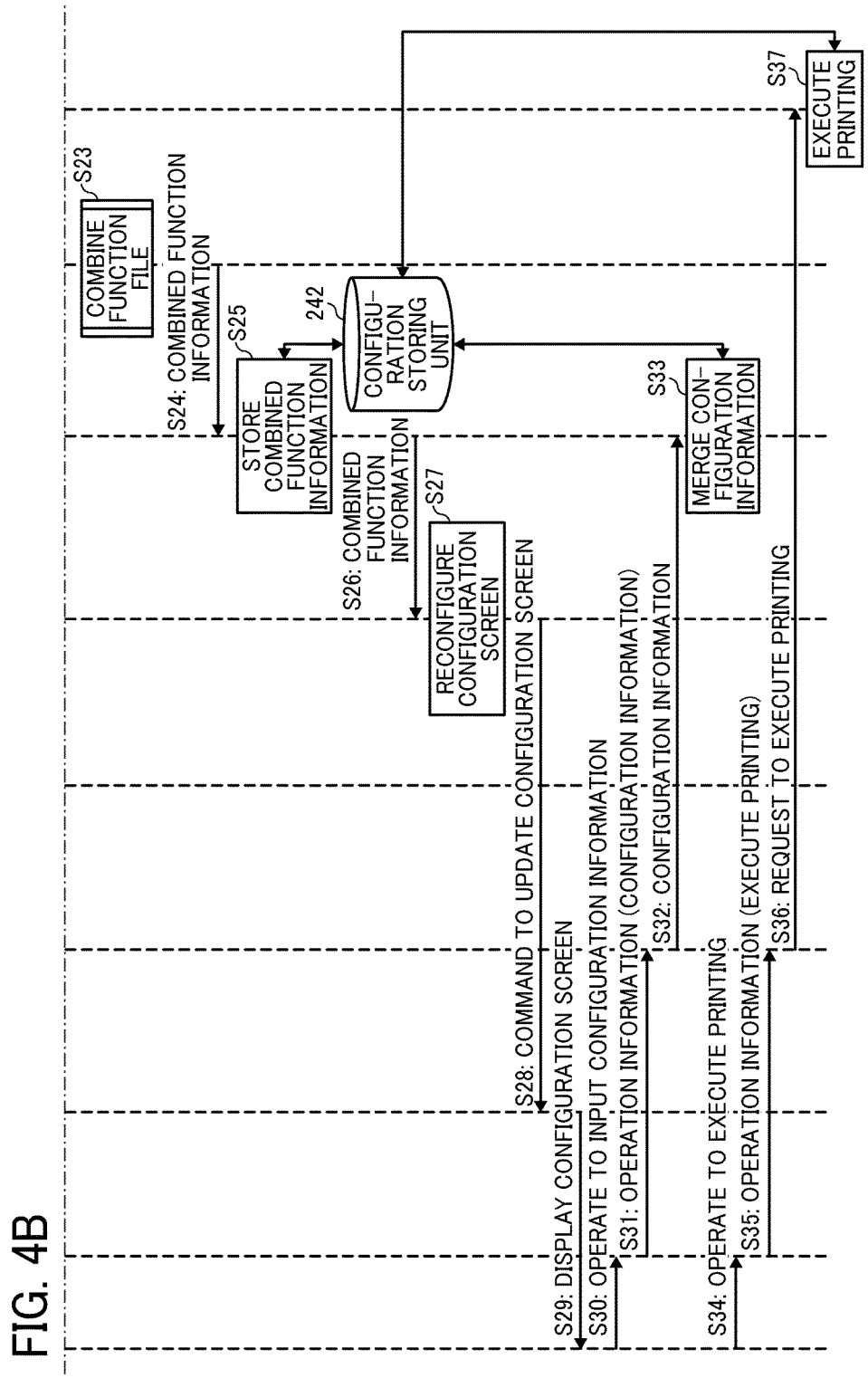
Figure 5:
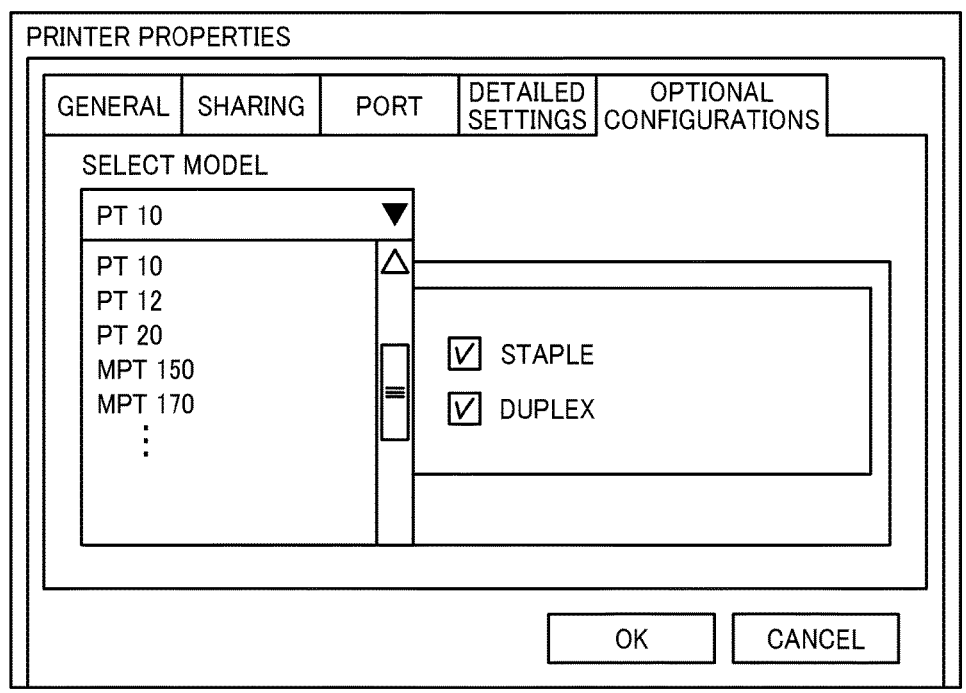
FIG. 5 is a diagram illustrating an operation of selecting a printer model on the printer configuration screen as an embodiment of the present invention.
Figure 6:
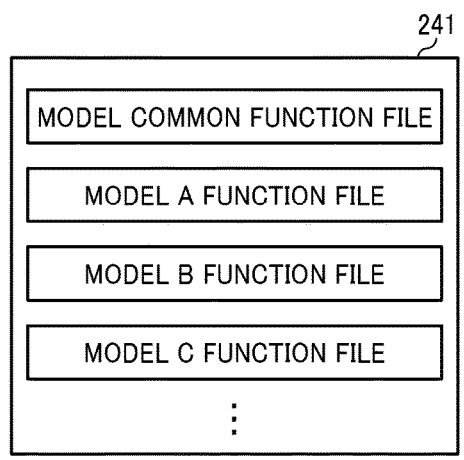
FIG. 6 is a diagram illustrating configurations of a model common function file and a model specific function file stored in a function file storing unit as an embodiment of the present invention.
Figure 7:
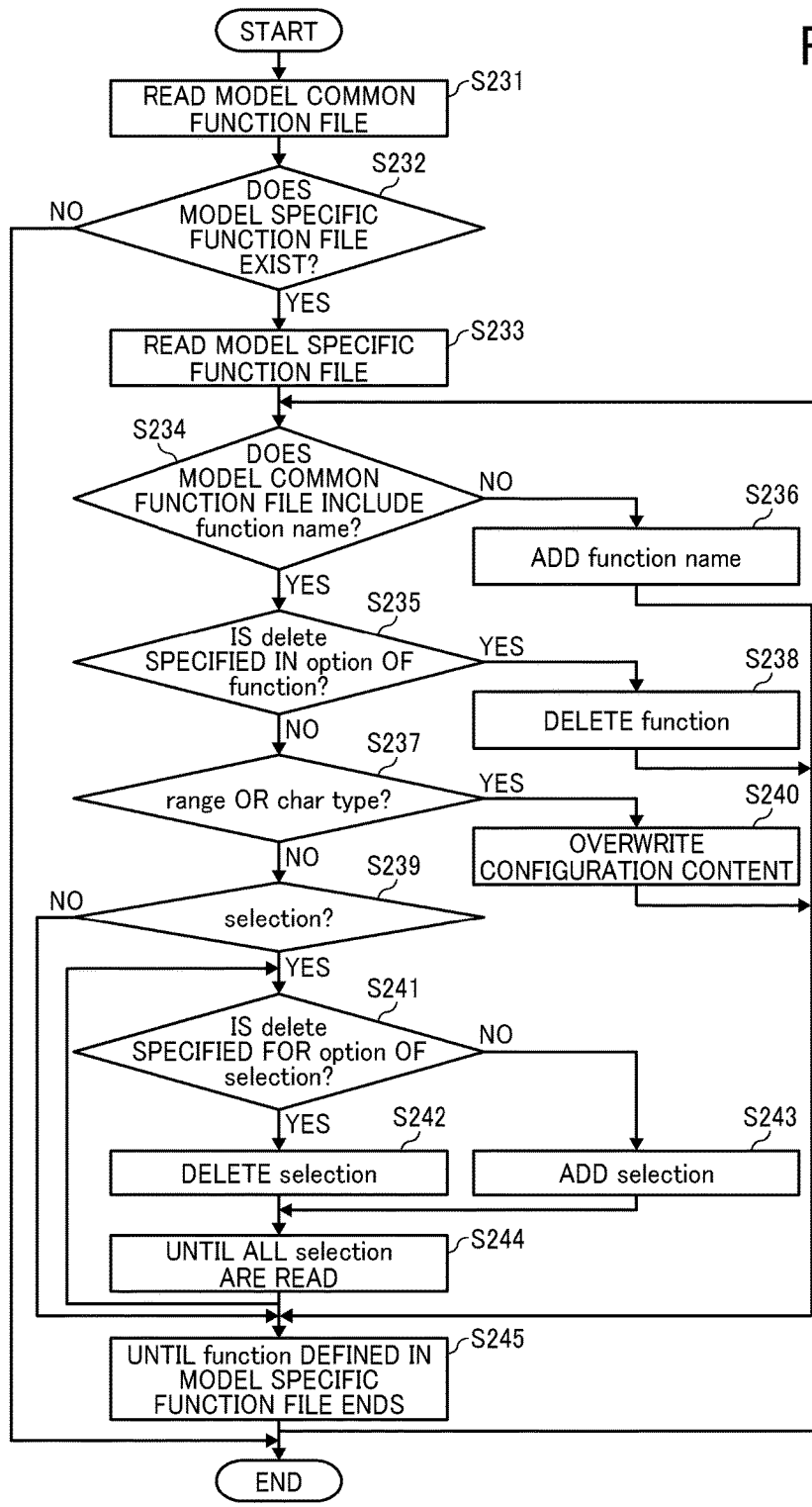
FIG. 7 is a flowchart illustrating an operation of combining function files performed by the client as an embodiment of the present invention.
Figure 9:
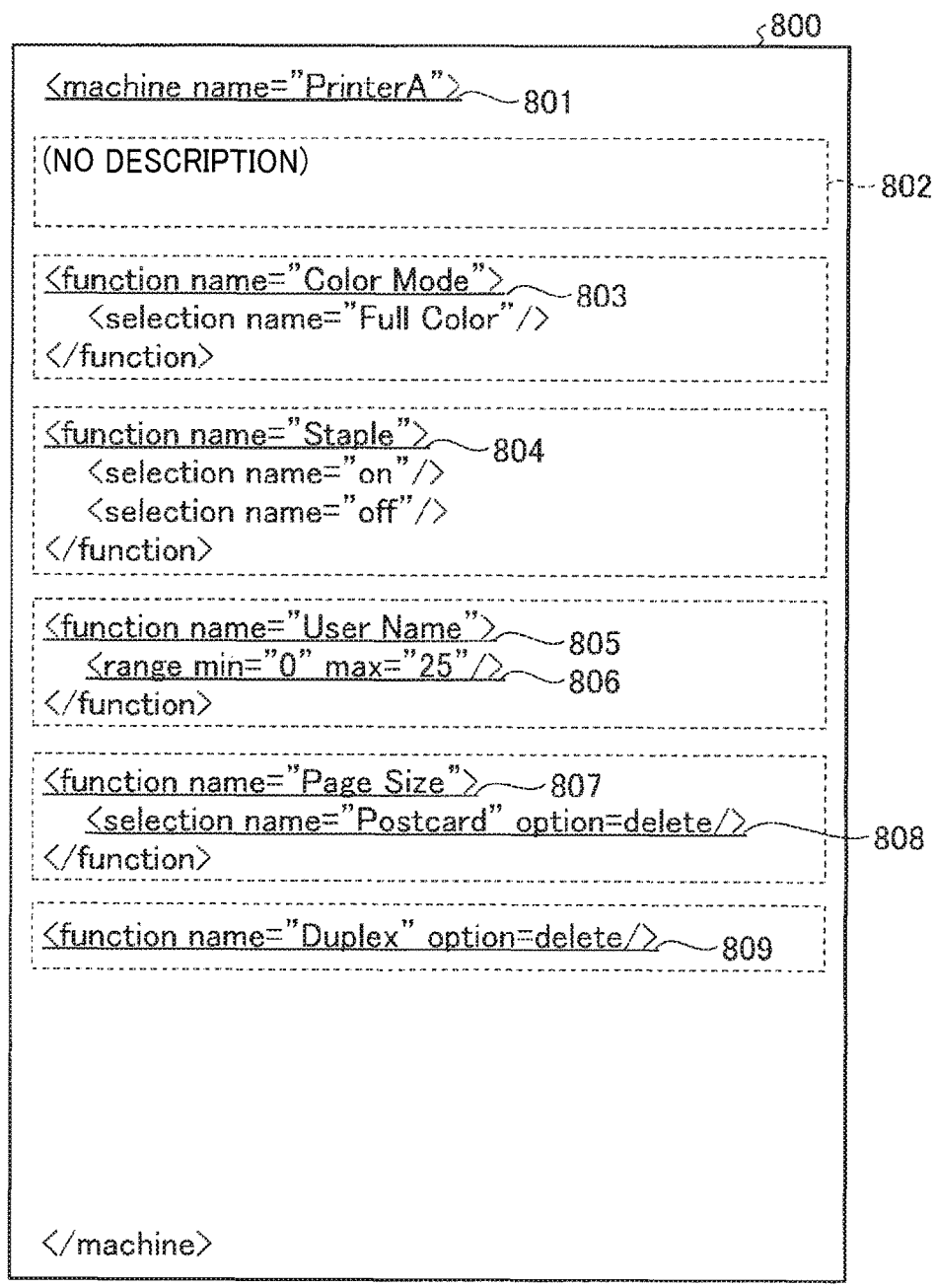
FIG. 9 is a diagram illustrating an example of the model specific function file as an embodiment of the present invention.

FIGS. 4A and 4B are a sequence diagram illustrating an operation of displaying a printer configuration screen on the client in this embodiment. FIG. 5 is a diagram illustrating an operation of selecting a printer model on the printer configuration screen in this embodiment. FIG. 6 is a diagram illustrating configurations of the model common function file and the model specific function file stored in the function file storing unit in this embodiment. FIG. 7 is a flowchart illustrating an operation of combining function files performed by the client in this embodiment. FIG. 8 is a diagram illustrating an example of the model common function file in this embodiment. FIG. 9 is a diagram illustrating an example of the model specific function file in this embodiment. FIG. 10 is a diagram illustrating an example of the combined function file in this embodiment. With reference to FIGS. 4 to 10, an operation of displaying the printer configuration screen on the client 10 in this embodiment is described below. Especially, with reference to FIGS. 7 to 10, an operation of combining function files on the client 10 is described.

In S11, the displaying unit 232 displays a configuration screen in response to a user instruction by a user 40 on the operation unit 231.

In S12, the operation unit 231 transfers operation information indicating a request to display the configuration screen input by user operation by user 40 to the acquisition unit 201 of the UI unit 200.

In S13, after acquiring (receiving) the operation information indicating the request to display the configuration screen, the acquisition unit 201 transfers the request to display the configuration screen to the configuration reading unit 202.

In S14, the configuration reading unit 202 reads a model file as a file that lists models of the respective printers 20 connected to the network 30 from the configuration storing unit 242.

Here, for example, the model file is a file that lists model names based on model information etc. acquired by the client 10 when a printer is connected to the network 30. In this embodiment, the model file is generated as described above. However, the generation of the model file is not limited to that. For example, the configuration reading unit 202 may read the function file corresponding to each printer 20 stored in the function file storing unit 241 and acquire the model name from the function file sequentially to generate the model file.

In S15, the configuration reading unit 202 transfers the request to display the configuration screen along with the read model file to the display controller 203.

Here, for example, the configuration reading unit 202 may read the combined function information used in executing printing via the configuration screen previously from the configuration storing unit 242 and request the display controller 203 to display the configuration screen based on function names and setting items in the combined function file included in the combined function information.

In S16, after receiving the request to display configuration screen and the model file, the display controller 203 generates information on the configuration screen that a model name listed on the model file may be selected and transfers the request to display configuration screen along with the information to the displaying unit 232.

In S17, after receiving the information on the configuration screen and the request to display configuration screen, the displaying unit 232 displays the configuration screen for the user 40.

In S18, the user 40 confirms the configuration screen displayed on the displaying unit 232 (e.g., the configuration screen illustrated in FIG. 5) and operates the operation unit 231 to select the model name of the printer that the user intends to configure printing and execute printing among printer model names displayed using pull-down menu etc.

In S19, the operation unit 231 transfers operation information specifying the model name of the printer selected on the configuration screen by user operation by user 40 to the acquisition unit 201.

As described above, in this embodiment, the model name is selected by user 40. However, the selection of the model name is not limited to that, and the client 10 (e.g., the configuration reading unit 202) may determine an appropriate model name and select the model name automatically. Otherwise, as the appropriate model name, for example, the number of times used for printing for each user who logs in the client 10 may be counted and stored for each model, and a name of the model most frequently used may be selected.

In S20, after acquiring (receiving) the operation information specifying the printer model name, the acquisition unit 201 transfers the model name specified by the operation information to the function file reading unit 211 in the combined function information generator 210.

In S21, the function file reading unit 211 transfers a request to acquire a function file corresponding to the received model name to the function file combining unit 212.

In S22, after receiving the request to acquire function file, the function file combining unit 212 reads (acquires) the model specific function file corresponding to the model name indicated by the request to acquire function file and the model common function file stored in the function file storing unit 241. As illustrated in FIG. 6, the combined function file storing unit 241 stores one model common function file defining functions that most printers include in common. The combined function fling storing unit 241 may additionally store one or more model specific function files defining functions specific to the model of each printer. In FIG. 6, the function file storing unit 241 stores at least three model specific function files, that is, model A function file, model B function file, and model C function file. For example, these model common function file and model specific function files are described in eXtensible Markup Language (XML) format.

As described above, the model common function file is a function file defining functions that are common to most of the printers connected to the network 30. That means, the model common function file does not necessarily defines those functions that are common to each of the printers 20 connected to the network 30. For example, the model common function file may define functions frequently used in each printer 20 or functions used in the majority of entire printers 20. As a result, in the model specific function file defining functions specific to each printer 20 respectively, if there are unnecessary functions among functions defined in the model common function file, a command to delete the function may be defined in the model specific function file. As described above, the functions that are included in most of the printers in common are defined in the model common function file. If only the functions included in all of the printers in common are defined in the model common function file, other functions of the minority of the models are defined only using model specific files for such models, resulting in increased data size of the model specific files. Therefore, by defining functions that are included in most of printers (that is, majority of printers) in common in the model common function file and defining the command to delete unnecessary functions in the model specific function files, it is possible to reduce data size. Specific codes described in the model common function file and the model specific function files are described later with reference to FIGS. 8 to 10.

In S23, the function file combining unit 212 combines the read model specific function file with the model common function file to generate the combined function file. The operation of combining the model specific function file with the model common function file is described below with reference to steps S231 to S245 illustrated in FIG. 7.

As described before in step S22, at S231, the function file combining unit 212 reads the model common function file from the function file storing unit 241.

Here, in this case, it is assumed that the function file combining unit 212 reads a model common function file 700 illustrated in FIG. 8 as the model common function file. As illustrated in FIG. 8, the model common function file 700 includes a code item 701 defining "machine name" as "Common Model", a code item 702 defining "function name" as "Collate", a code item 703 defining the function name as "Color Mode", a code item 704 defining no code, a code item 705 defining the function name as "User Name", a code item 707 defining the function name as "Page Size", and a code item 709 defining the function name as "Duplex".

In the code item 702 whose function name is "Collate", "on" and "off" are defined as a selection item "selection name" indicating setting options in the function. In the code item 703 whose function name is "Color Mode", a selection item "Mono" is defined as a selection item for the function. In the code item 705 whose function name is "User Name", "min="0" max="10"" is defined as a setting range ("range") for the function in a code item 706. In the code item 707 whose function name is "Page Size", "A4" and "Letter" are defined as a selection item for the function. Furthermore, "Postcard" is defined in a code item 708. In addition, in the code item 709 whose function name is "Duplex", "on" and "off" are defined as a selection item for the function.

Hereinafter, the selection items, setting range, and available character (described later) corresponding to each function described above are collectively referred to as "setting items" in some cases.

Subsequently, the operation proceeds to step S232.

The function file combining unit 212 checks whether or not the model specific function file corresponding to the model name indicated by the request to acquire function file exists among function files stored in the function file storing unit 241. If the model specific function file corresponding to the model name exists (YES in S232), the operation proceeds to step S233. By contrast, if the model specific function file corresponding to the model name does not exist (NO in S232), it is considered that there is no function file to be combined with the model common function file, and the combining operation ends.

Step S233

The function file combining unit 212 reads the model specific function file corresponding to the function name indicated by the request to acquire function file from the function file storing unit 241.

Here, in this case, it is assumed that the function file combining unit 212 reads a model specific function file 800 illustrated in FIG. 9 as the model specific function file corresponding to the model name indicated by the request to acquire function file. As illustrated in FIG. 9, the model specific function file 800 includes a code item 801 defining "machine name" as "PrinterA", a code item 802 defining no code, a code item 803 defining the function name as "Color Mode", a code item 804 defining the function name as "Staple", a code item 805 defining the function name as "User Name", a code item 807 defining the function name as "Page Size", and a code item 809 defining the function name as "Duplex".

In the code item 803 whose function name is "Color Mode", a selection item "Full Color" is defined as a selection item for the function. In the code item 804 whose function name is "Staple", "on" and "off" are defined as a selection item for the function. In the code item 805 whose function name is "User Name", "min="0" max="25"" is defined as a setting range ("range") for the function in a code item 806. In the code item 807 whose function name is "Page Size", "Postcard" is defined as a selection item for the function in the code item 808. Furthermore, in the code item 808, specifying deletion as an option ("option=delete") is defined. In addition, in the code item 809 whose function name is "Duplex", specifying deletion as an option ("option=delete") is defined.

Subsequently, the operation proceeds to step S234.

Step S234

Among "function name" indicating model name defined in the read model specific function file, the function file combining unit 212 specifies "function name" sequentially and determines whether or not the specified model name is defined in the model common function file. If the model name corresponding to the model name defined in the model specific function file is defined in the model common function file (YES in S234), the operation proceeds to step S235. By contrast, if the model name corresponding to the model name defined in the model specific function file is not defined in the model common function file (NO in S234), the function file combining unit 212 determines that the specified model name is to be added to the combined function file, and the operation proceeds to S236.

In the case illustrated in FIGS. 8 and 9, among model names defined in the model specific function file 800, "Color Mode", "User Name", "Page Size", and "Duplex" are also defined in the model common function file 700, so the operation proceeds to step S235. By contrast, among model names defined in the model specific function file 800, "Staple" is not defined in the model common function file 700, so the operation proceeds to step S236.

Step S235

The function file combining unit 212 determines whether or not specifying deletion is defined as an option in the code item of the function for the function name in the model specific function file specified in step S234. More specifically, the function file combining unit 212 determines whether or not "option=delete" is defined in the code item. That is, the function file combining unit 212 determines whether or not it is specified to delete the function itself regarding the function of the function name in the specified model specific file. If it is not specified to delete in the code item of the function (NO in S235), the operation proceeds to step S237. By contrast, if it is specified to delete in the code item of the function (YES in S235), the operation proceeds to step S238.

In the case illustrated in FIGS. 8 and 9, if the model name in the model specific function file 800 specified in S234 is "Duplex", specifying deletion as an option ("option=delete") is defined in the code item 809, so the operation proceeds to step S238.

Step S236

Since the model name specified in the model specific function file is not specified in the model common function file, the function file combining unit 212 adds code items indicating the function name, selection item for the function, setting range, and available character to the combined function file.

Here, it is assumed that the function file combining unit 212 generates a combined function file 900 illustrated in FIG. 10 as the combined function file generated by combining the model common function file 700 with the model specific function file 800. Using the model common function file 700 as an original, the combined function file 900 is generated by adding, overwriting, and deleting functions on the model common function file 700 based on the code defined in the model specific function file 800. In the case illustrated in FIGS. 8 to 10, since "Staple" is not defined in the model common function file 700 among function names defined in the model specific function file 800, the function file combining unit 212 adds the code item 804 defining "Staple" as the function name in the model specific function file 800 to the combined function file 900 originating from the model common function file 700 as the code item 903 and further adds a code defining a selection item "on" and "off". For example, an example of addable functions and selection items is illustrated in Table 1 below.

ing unit 212 determines that paper feeding tray ("Input Bin") is not defined in the model common function file, the function file combining unit 212 may add a code item indicating the function name "Input Bin" to the combined function file and further add code items defining its selection items "Tray2" and "Tray3" to the combined function file.

Subsequently, the operation proceeds to step S245.

Step S237

The function file combining unit 212 determines whether or not the setting range ("range") or available character ("char type") is defined in the code item defining function names in the model specific function file specified in step S234. That is, the function file combining unit 212 determines whether or not it is specified to modify a condition for acceptable characters and numerals regarding the function of the function name in the specified model specific file. If neither the setting range nor the available characters is defined (NO in S237), the operation proceeds to step S239. If either the setting range or the available characters is defined (YES in S237), the operation proceeds to step S240.

Step S238

If specifying deletion is defined as an option in the code item of the function for the function name in the model specific function name specified in S234, the function file combining unit 212 deletes code items defining its function, selection items, setting range, or available characters in the combined function file.

In the case illustrated in FIGS. 8 to 10, since deletion is specified as an option in the code item 809 for the function "Duplex" among functions defined in the model specific function file 800, in the combined function file 900 originating from the model common function file 700, the function file combining unit 212 deletes the code item for the function name "Duplex" and the code item defining selection items "on" and "off" (i.e., the code item 907). For example, an example of functions that can be deleted and selection items is illustrated in Table 2 below.

TABLE 1

| Function name | function name | Selection name (Model common function file) | Selection name (Model specific function file) | Selection name (Combined function file) |
| --- | --- | --- | --- | --- |
| Color mode | Color Mode | Mono | Full Color | Mono<br>Full Color |
| Paper feeding tray | Input Bin | Auto<br>Tray1<br>Bypass Tray | Tray2<br>Tray3 | Auto<br>Tray1<br>Tray2<br>Tray3<br>Bypass Tray |
| Paper type | Media Type | Standard | Glossy<br>Transparency<br>Recycle | Standard<br>Glossy<br>Transparency<br>Recycle |
| Paper size | Paper Size | A4<br>Letter | A3<br>A5<br>B4<br>B5<br>Half Letter<br>12*11<br>9*11 | A4<br>Letter<br>A3<br>A5<br>B4<br>B5<br>Half Letter<br>12*11<br>9*11 |
| Resolution | Resolution | 300*300 | 400*400<br>600*600<br>600*1200<br>1200*1200 | 300*300<br>400*400<br>600*600<br>600*1200<br>1200*1200 |
| Duplex | Duplex | off | on | on<br>off |

TABLE 2

| Function name | function name | Selection name (Model common function file) |
| --- | --- | --- |
| Color mode | Color Mode | Mono<br>Full Color |
| Paper feeding tray | Input Bin | Auto<br>Tray1<br>Tray2<br>Tray3<br>Bypass Tray |
| Paper type | Media Type | Standard<br>Glossy<br>Transparency<br>Recycle |
| Paper size | Paper Size | A4<br>Letter<br>A3<br>A5<br>B4<br>B5<br>Half Letter<br>12*11<br>9*11 |
| Resolution | Resolution | 300*300<br>400*400<br>600*600<br>600*1200<br>1200*1200 |
| Duplex | Duplex | on<br>off |

For example, among function names defined in the model specific function file in Table 1, if the function file combin- For example, in the model specific function file, among function names defined in the model common function file illustrated in Table 2, if deletion is specified as an option in the code item defining the paper type ("Media Type"), in the combined function file, the function file combining unit 212 may delete the code item indicating the function name "Media Type" and further deletes code items defining selection items "Standard", "Glossy", "Transparency", and "Recycle".

Subsequently, the operation proceeds to step S245.

Step S239

The function file combining unit 212 determines whether or not the selection item ("selection name") is defined in the code item defining function names in the model specific function file specified in step S234. That is, the function file combining unit 212 determines whether or not it is specified to modify the selection items for setting regarding the function of the function name in the specified model specific file. If the selection item is defined (YES in S239), the operation proceeds to step S241. If the selection item is not defined (NO in S239) the operation proceeds to step S245.

Step S240

If the setting range ("range") or available characters ("char type") is defined in the code item for the function of function names in the model specific function file specified in S234, the function file combining unit 212 overwrites the code item defining the setting range and available characters in the combined function file with the code item defining the setting range and available characters in the model specific function file. In this embodiment, it is assumed that the setting content for the function to be overwritten is the setting range for the function or available characters. However, the setting content for the function to be overwritten is not limited to that. It is possible to overwrite a setting content for the function that two or more setting items cannot be selected or it is unnecessary to select two or more setting items.

In the case illustrated in FIGS. 8 to 10, among functions defined in the model specific function file 800, there is the code item 806 defining the setting range ("range") in the code item 805 whose function is "User Name". Among functions defined in the model common function file 700, there is the code item 706 defining the setting range in the code item 705 whose function is "User Name". As a result, in the combined function file 900 originating from the model common function file 700, the function file combining unit 212 overwrites the code corresponding to the code item 706 ("min="0" max="10"") with the code item 806 in the model specific function tile 800 and sets the code item 905 ("min="0" max="25"") in the code item 904 defining the function name "User Name". For example, an example of functions that can be overwritten and selection items is illustrated in Table 3 below.

TABLE 3

| Function name | function name | range Model common function file) | range (Model specific function file) | range (Combined function file) |
|---|---|---|---|---|
| User name | User Name | Min = 0 Max = 10 | Min = 0 Max = 25 | Min = 0 Max = 25 |
| Password | Password | Min = 0 Max = 10 | Min = 0 Max = 25 | Min = 0 Max = 25 |
| Number of copies | Copies | Min = 1 Max = 999 | Min = 1 Max = 9999 | Min = 1 Max = 9999 |
| Enlarge/ Reduce | Zoom | Min = 0 Max = 150 | Min = 0 Max = 300 | Min = 0 Max = 300 |

For example, as illustrated in Table 3, since there is the code "min="1" max="999"" defining the setting range ("range") for the function "Copies" in the model common function file and the code "min="1" max="9999"" defining the setting range for the same function in the model specific function file, in the combined function file originating from the model common function file, the function file combining unit 212 may overwrite the code item "min="1" max="999"" with the code "min="1" max="9999"" in the model specific function file.

In addition, an example of functions that can be overwritten and their available characters is illustrated in Table 4 below.

TABLE 4

| Function name | function name | char type (Model common function file) | char type (Model specific function file) | char type (Combined function file) |
|---|---|---|---|---|
| User name | User Name | 0-9, a-z | 0-9, 0x2d | 0-9, 0x2d |
| Password | Password | 0-9 | 0-9, a-z | 0-9, a-z |
| File name | File Name | 0-9, a-z | 0-9, a-z, JIS | 0-9, a-z, JIS |

For example, as illustrated in Table 4, since there is the code "0-9, a-z" defining the available characters ("char type") for the function "User Name" in the model common function file and the code "0-9, 0x2d" defining the setting range for the same function in the model specific function file, in the combined function file originating from the model common function file, the function file combining unit 212 may overwrite the code item "0-9, a-z" with the code "0-9, 0x2d" in the model specific function file. Here, "0x2d" is ASCII code indicating a hyphen.

In addition, as illustrated in Table 4, since there is the code "0-9, a-z" defining the available characters ("char type") for the function "File Name" in the model common function file and the code "0-9, a-z, JIS" defining the setting range for the same function in the model specific function file, in the combined function file originating from the model common function file, the function file combining unit 212 may overwrite the code item "0-9, a-z" with the code "0-9, a-z, JIS" in the model specific function file. Here, in Table 4, "JIS" indicates that is allowed to input Japanese characters.

Subsequently, the operation proceeds to step S245.

Step S241

The function file combining unit 212 determines whether or not specifying deletion is defined as an option in the selection item ("selection name") of the function for the function name in the model specific function file specified in step S234. More specifically, the function file combining unit 212 determines whether or not "option=delete" is defined in the code item. That is, the function file combining unit 212 determines that it is specified to modify the selection items for setting determined in S239 whether adding the selection item or deleting the selection item regarding the function of the function name in the specified model specific file. If it is specified to delete in the code item of the selection item for the function (YES in S241), the operation proceeds to step S242. By contrast, if it is not specified to delete in the code item of the selection item for the function (NO in S241), the operation proceeds to step S243.

Step S242

If specifying deletion is defined as an option in the code item of the selection item ("selection name") for the function for the function name in the model specific function name specified in S234, the function file combining unit 212 deletes code items defining the selection item in the combined function file.

In the case illustrated in FIGS. 8 to 10, since deletion is specified as an option in the code item 808 defining the selection item "Postcard" in the code item 807 "Page Size" among functions defined in the model specific function file 800, in the combined function file 900 originating from the model common function file 700, the function file combining unit 212 deletes the code item defining the selection item "Postcard" for the function name "Page Size" (i.e., the code item 906).

In addition, in Table 2 described before, among function names defined in the model specific function file, if deletion is specified as an option in the code item defining the resolution ("Resolution") and defining "400*400" as the selection item, in the combined function file, the function file combining unit 212 may delete the code item defining the selection item "400*400".

Subsequently, the operation proceeds to step S244.

Step S243

If specifying deletion is not defined as an option in the code item of the selection item ("selection name") for the function for the function name in the model specific function name specified in S234, the function file combining unit 212 adds the code item defining the selection item in the combined function file.

In the case illustrated in FIGS. 8 to 10, since deletion is not specified as an option in the code item 803 defining the selection item "Full Color" in the code item "Color Mode" among functions defined in the model specific function file 800, in the combined function file 900 originating from the model common function file 700, the function file combining unit 212 adds the code item defining the selection item "Full Color" to the code item 902 whose function name is "Color Mode".

In addition, in Table 1 described before, among function names defined in the model specific function file, if deletion is specified as an option in the code item defining the paper type ("Media Type") defining "Recycle" as the selection item, in the combined function file, the function file combining unit 212 may add the code item defining the selection item "Recycle".

Subsequently, the operation proceeds to step S244.

Step S244

The function file combining unit 212 determines whether or not the operation in steps S241 to S243 is performed for all selection items ("selection name") regarding the function of function names in the model specific function file specified in S234. If the operation is performed for all selection items, the operation proceeds to step S245. By contrast, if the operation is not performed for all selection items, a subsequent selection item is specified, and the operation goes back to step S241.

Step S245

The function file combining unit 212 determines whether or not the operation in steps S234 to S244 is performed regarding the function of all function names in the model specific function file. If the operation in steps S234 to S244 is performed for all functions, the operation of combining function files is finished, and the function file combining unit 212 outputs the combined function file combining the model specific function file with the model common function file. By contrast, if the operation in steps S234 to S244 is not performed for all functions, the operation goes back to step S234.

By performing the operation in steps S231 to S245, the operation of combining the model specific function file with the model common function file is performed by the function file combining unit 212. In the case illustrated in FIGS. 8 to 10, by performing the operation in steps S231 to S245 on the model common function file 700 and the model specific function file 800 described above, the function file combining unit 212 generates the combined function file 900 illustrated in FIG. 10. As illustrated in the code item 802 in the model specific function file 800, since there is no code corresponding to the code item 901 defining the function name "Collate" in the combined function file 900, the code item 702 defining the function name "Collate" in the model common function file 700 is inherited. Here, the description goes back to the sequence chart in FIGS. 4A and 4B.

In S24, the function file combining unit 212 transfers the combined function file being generated as the combined function information to the function file reading unit 211.

In S25, the function file reading unit 211 stores the combined function information being received in the configuration storing unit 242.

In S26, the function file reading unit 211 transfers the combined function information to the display controller 203 in the UI unit 200.

In S27, after receiving the combined function information, the display controller 203 reconfigures the configuration screen based on the function names and setting items defined in the combined function information.

In S28, the display controller 203 transfers a command to update configuration screen along with information on the reconfigured configuration screen to the displaying unit 232.

In S29, after receiving the information on the reconfigured configuration screen and the command to update configuration screen, the displaying unit 232 updates the configuration screen and displays the configuration screen for the user 40.

As described above, on the configuration screen displayed on the displaying unit 232 in S17, the screen is changed into the reconfigured configuration screen corresponding to the printer of the model name selected in S18. As a result, the user 40 may recognize that the configuration screen corresponds to the selected model name.

In S30, the user 40 confirms the reconfigured configuration screen displayed on the displaying unit 232 and performs an operation of inputting print setting information on the operation unit 231.

In S31, the operation unit 231 transfers operation information including the print setting information input on the configuration screen by user operation by the user 40 to the acquisition unit 201.

In S32, after acquiring (receiving) the operation information including the print setting information, the acquisition unit 201 transfers the print setting information included in the operation information to the function file reading unit 211 in the combined function information generator 210.

In S33, the function file reading unit 211 merges the received print setting information with the combined function information (i.e., the combined function file actually) stored in the configuration storing unit 242 and stores (updates) the merged information as new combined function information in the configuration storing unit 242.

In S34, the user 40 performs an operation of executing printing on the configuration screen displayed on the configuration screen displayed on the displaying unit 232.

In S35, the operation unit 231 transfers operation information indicating the command to execute printing operated on the configuration screen by the user 40 to the acquisition unit 201.

In S36, after acquiring (receiving) the operation information indicating the command to execute printing, the acquisition unit 201 transfers a request to execute printing to the drawing unit 220.

In S37, the drawing unit 220 reads the combined function information that the combined function file is merged with the print setting information from the configuration storing unit 242 using the function file reading unit 211 in S33 and converts intermediate data of print data (e.g., XPS format data in case of the V4 driver) into PDL data reflecting the content of the combined function information.

Subsequently, the drawing unit 220 transfers the converted PDL data to the printer 20 corresponding to the model name selected in S18 via the network 30. The printer 20 performs printing out based on the received PDL data.

Here, after converting into the PDL data using specific combined function information and transferring the converted data, the drawing unit 220 may delete the combined function information from the configuration storing unit 242. As a result, by storing the combined function information separately from the function file, it is possible to prevent data size in the auxiliary storage device 108 from being increased. In this case, the entity that deletes the combined function information is not limited to the drawing unit 220.

By performing the operation in steps S11 to S37 described above, operations of displaying the printer configuration screen on the client 10 and combining the function files are performed. The operation in steps S19 to S29 in FIGS. 4A and 4B may not be performed each time the model name is selected by user operation in S18. For example, the operation in steps S19 to S29 may be performed when a model name different from the model name previously selected is selected on the configuration screen by user operation or in case of acquiring the model name from the printer by performing bi-directional communication with the printer when the configuration screen is displayed.

As described above, the function file storing unit 241 stores the model specific function file defining functions specific to the model of each printer 20 and the model common function file defining functions that most printers include in common and generates the combined function file by combining the model specific function file corresponding to the model selected by the user with the model common function file in case of configuring print settings by user operation. As a result, it is unnecessary that all functions and setting items used in the model are defined in the model specific function file, and it is required to define functions and setting items not defined in the model common function file or different from the model common function file in the model specific function file. Consequently, compared to the case that all function and setting items used in the model are defined, it is possible to reduce data size of the model specific function file. Therefore, it is possible to provide a printer driver that may prevent data size of the entire multiple function files (i.e., the model specific function file and the model common function file) from being increased. For example, this embodiment may be applied to the V4 driver as the printer driver described above.

Regarding a client 10a in a variation of the first embodiment, points different from the client 10 in the first embodiment are mainly described below. In the variation, in case of displaying setting items for functions included in the combined function file that the model specific function file is merged with the model common function file on the configuration screen, an operation of determining a displaying order is described below. It should be noted that the entire configuration of the information processing system and the hardware configuration of the client 10a in this variation is similar to the configuration illustrated in FIGS. 1 and 2.

Figure 11:
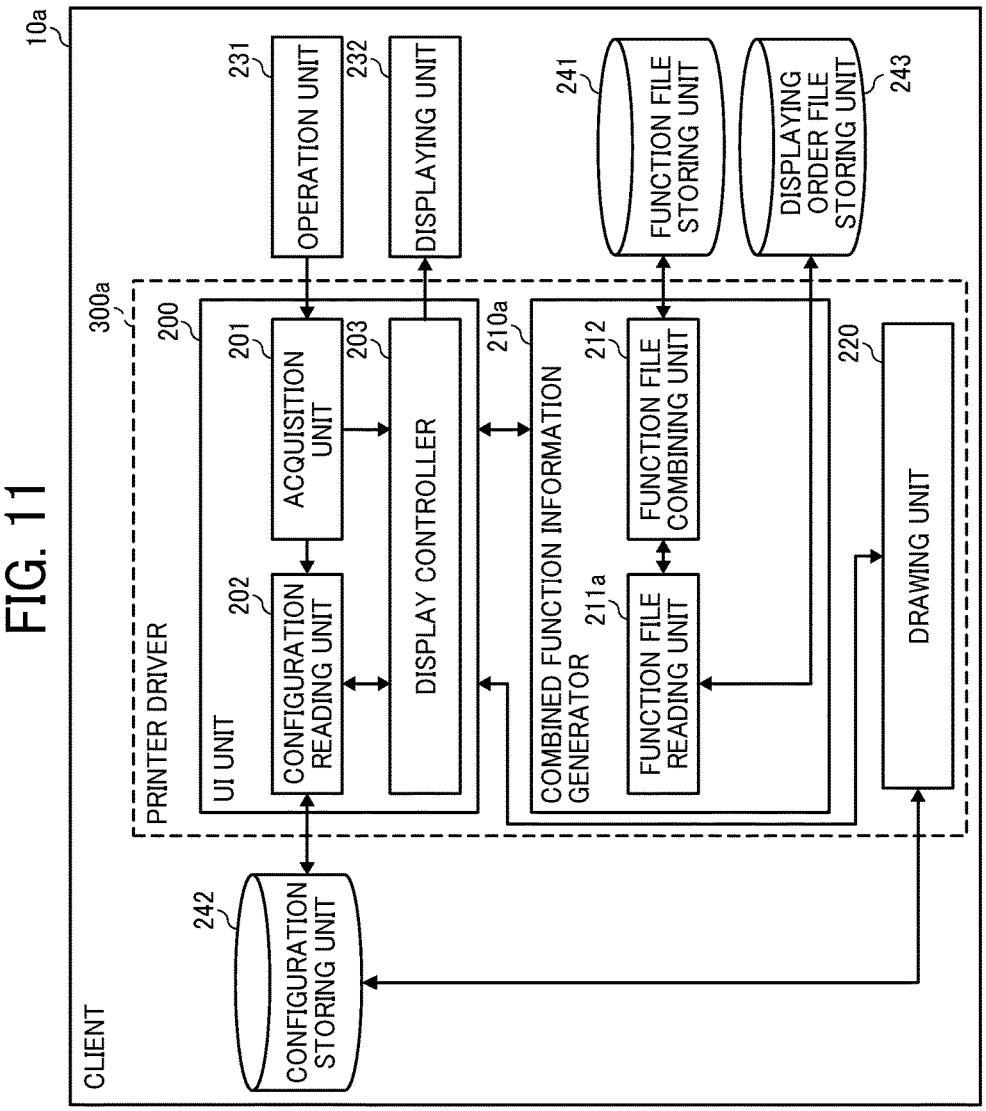
FIG. 11 is a block diagram illustrating a functional configuration of the client as an embodiment of the present invention.

FIG. 11 is a block diagram illustrating a functional configuration of the client in this variation. A functional configuration of the client 10a in this variation is described below with reference to FIG. 11.

As illustrated in FIG. 11, a printer driver 300a as a model common driver is installed in the client 10a as described above. Furthermore, the client 10a includes an operation unit 231, a displaying unit (display unit) 232, a function file storing unit 241 (a first storing unit), a configuration storing unit 242, and a displaying order file storing unit 243 (a third storing unit). As illustrated in FIG. 11, by executing by the CPU 101, functional units such as a user interface (UI) unit 200, a combined function information generator 210a, and a drawing unit 220 are implemented in the printer driver 300a. In addition, the printer driver 300a includes function files defining functions included in a printer (such as a model common function file and a model specific function file as described later) as a package. It should be noted that the functions of the UI unit 200, the drawing unit 220, the operation unit 231, the displaying unit 232, and the configuration storing unit 242 illustrated in FIG. 11 are similar to the functions of the UI unit 200, the drawing unit 220, the operation unit 231, the displaying unit 232, and the configuration storing unit 242 illustrated in FIG. 3.

The combined function information generator 210a is a functional unit for generating a combined function file by combining a model specific function file defining functions specific to the model of each printer 20 with a model common function file defining functions that most printers include in common. The combined function information generator 210a includes a function file reading unit 211a (a reading unit) and a function file combining unit 212 (a combining unit). It should be noted that the function of the function file combining unit 212 illustrated in FIG. 11 is similar to the function of the function file combining unit 212 illustrated in FIG. 3.

The function file reading unit 211a is a functional unit that transfers a request to acquire a function file corresponding to the model name selected by user operation to the function file combining unit 212. In addition, the function file reading unit 211a reads a displaying order file (described later) from the displaying order file storing unit 243 and sorts the order of setting items for functions defined in the combined function file included in the combined function information in accordance with priorities of a layout order for setting items of functions specified in the displaying order file. For example, the function file reading unit 211a is implemented by a program (i.e., the printer driver 300a) executed by the CPU 101 in FIG. 2.

The displaying order file storing unit 243 is a functional unit for storing the displaying order file specifying priorities of the layout order for setting items of functions for the entire printer 20. For example, the displaying order file storing unit 243 is implemented by the auxiliary storage device 108 in FIG. 2.

In the above description, the acquisition unit 201, the configuration reading unit 202, the display controller 203, the function file reading unit 211a, the function file combining unit 212, and the drawing unit 220 are implemented by programs as software. However, the acquisition unit 201, the configuration reading unit 202, the display controller 203, the function file reading unit 211a, the function file combining unit 212, and the drawing unit 220 may also be implemented by hardware circuitry such as FPGA and ASIC etc.

In addition, the functional units in FIG. 11 are functions illustrated conceptually, and configurations of the functional units in FIG. 11 are not limited to that. For example, multiple functional units separately illustrated in FIG. 11 may be implemented as one functional unit. By contrast, functions included in one functional unit in FIG. 11 may be divided into multiple functions and implemented as multiple functional units. In addition, in this variation, functional units implemented by the printer driver 300a in FIG. 11 are implemented by executing one program as software. However, the configuration of those functional units is not limited to that, and those functional units may be implemented by executing multiple software programs. For example, among functional units included in the printer driver 300a, the UI unit 200 and the combined function information generator 210a may be implemented separately from the drawing unit 220 by executing separate software programs respectively.

Figure 12B:
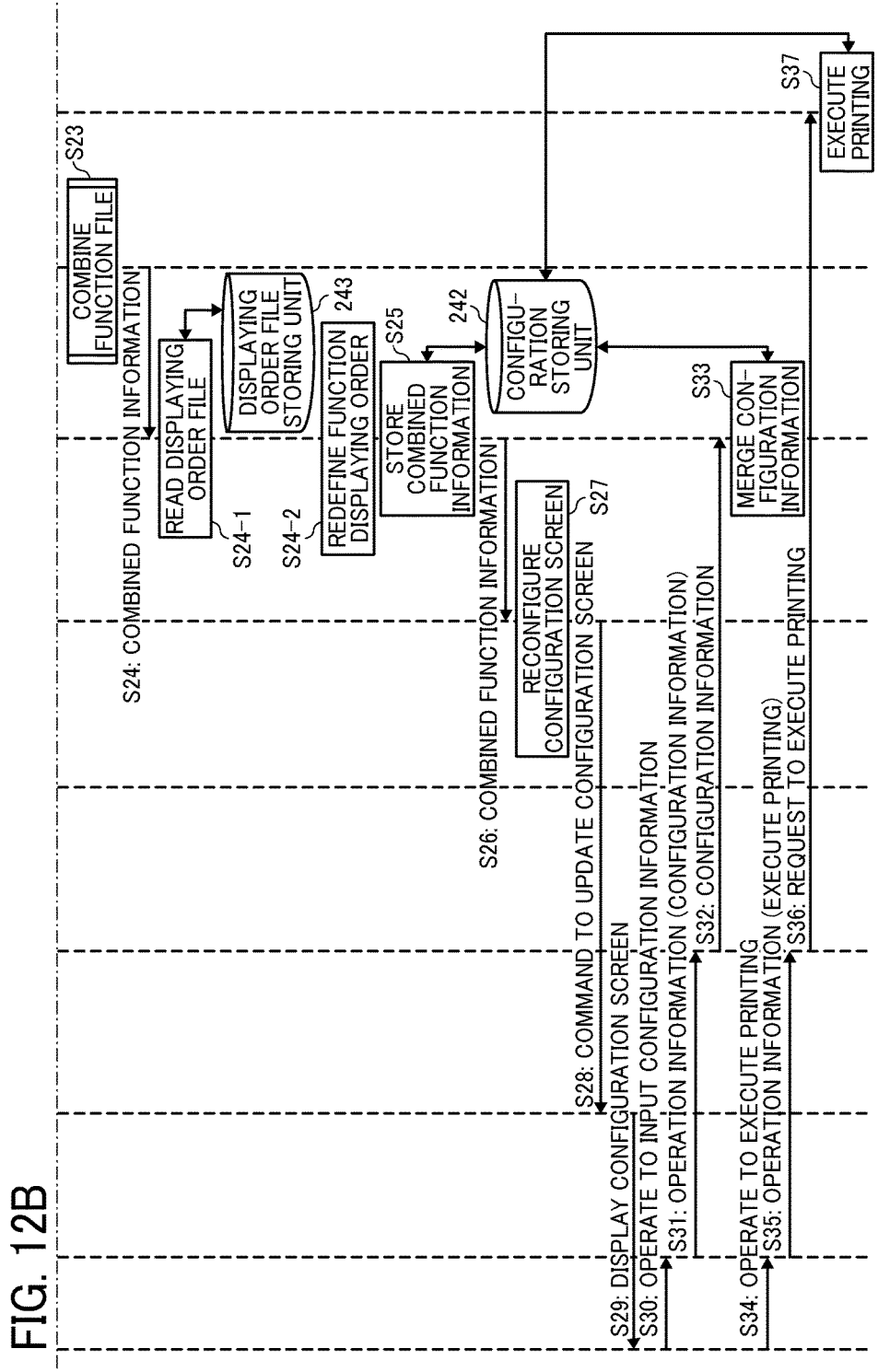

FIGS. 12A and 12B are sequence charts illustrating an operation of displaying a printer configuration screen on the client in this variation. FIG. 13 is a diagram illustrating a status that items selectable in a specific function are laid out in a predetermined displaying order in this variation. FIG. 14 is a diagram illustrating a displaying order table in this variation. With reference to FIGS. 12 to 14, an operation of displaying the printer configuration screen on the client 10a in this variation is described below.

Operations in steps S11 to S24 are similar to the operations in steps S11 to S24 illustrated in FIGS. 4A and 4B respectively.

In S24-1, the function file reading unit 211a reads the displaying order file from the displaying order file storing unit 243.

For example, the displaying order file may be implemented by a displaying order table 1000 illustrated in FIG. 14 and specifies priorities of a layout order for setting items for each function.

In S24-2, the function file reading unit 211a sorts the order of setting items for functions defined in the combined function file included in the combined function information in accordance with priorities of a layout order for setting items of functions specified in the displaying order file to redefine the order.

More specifically, on the configuration screen displayed on the displaying unit 232, if it is assumed that the setting items for each function are displayed in accordance with an order of code items defining setting items in the combined function file, the function file reading unit 211a sorts the layout order of code items defining setting items for each function in the combined function file included in the combined function information in accordance with priorities of a layout order for setting items for each function specified in the displaying order file. For example, with reference to the displaying order table 1000, if function "Color Mode" is included in the combined function file, the function file reading unit 211a sorts the layout order of code items defining the setting items in order of "Full Color", "Mono", and "Two Toner". Subsequently, the function file reading unit 211a regards the combined function file that the order of setting items for each function is sort and redefined as a new combined function information.

Operations in steps S25 and S26 are similar to the operations in steps S25 and S26 illustrated in FIG. 4B respectively.

In S27, after receiving the combined function information, the display controller 203 reconfigures the configuration screen based on the function names and setting items defined in the combined function information.

More specifically, in reconfiguring the configuration screen, the display controller 203 reflects the order of setting items for each function in the combined function file included in the combined function information redefined by the function file reading unit 211a.

Here, the displaying order file stored in the displaying order file storing unit 243 specifies the priorities of layout order for setting items for each function of the printer 20. However the configuration of the displaying order file is not limited to that. For example, in addition to the layout order of setting items, or instead of the layout order of setting items, the displaying order file may specify priorities of displaying order or displaying position for functions of the printer 20.

In S28, the display controller 203 transfers a command to update configuration screen along with information on the reconfigured configuration screen to the displaying unit 232.

In S29, after receiving the information on the reconfigured configuration screen and the command to update configuration screen, the displaying unit 232 updates the configuration screen and displays the configuration screen for the user 40.

Here, for example, if the function "Paper Size" is included in the configuration screen, a case that setting items for "Paper Size" (selection items in this case) is displayed in accordance with an order redefined by the function file reading unit 211a is illustrated in FIG. 13.

Operations in steps S30 to S37 are similar to the operations in steps S30 to S37 illustrated in FIG. 4B respectively.

As described above, in this variation, by using the displaying order file specifying priorities of a displaying order for setting items for each function, the displaying order for setting items of each function displayed on the reconfigured configuration screen is regarded as the order corresponding to the priorities specified in the displaying order file. As a result, for example, among setting items for each function, by specifying the displaying order file so that the setting items selected often are displayed upward, it is possible to enhance user operability of configuring print settings.

Embodiment 2

Regarding a client in a second embodiment, points different from the client 10 (10a) in the first embodiment are mainly described below In this embodiment, several variations regarding timing of combining the model common function file with the model specific function file are mainly described below. It should be noted that the entire configuration of the information processing system and the hardware configuration of the client in this embodiment is similar to the configuration described in the first embodiment.

Figure 15:
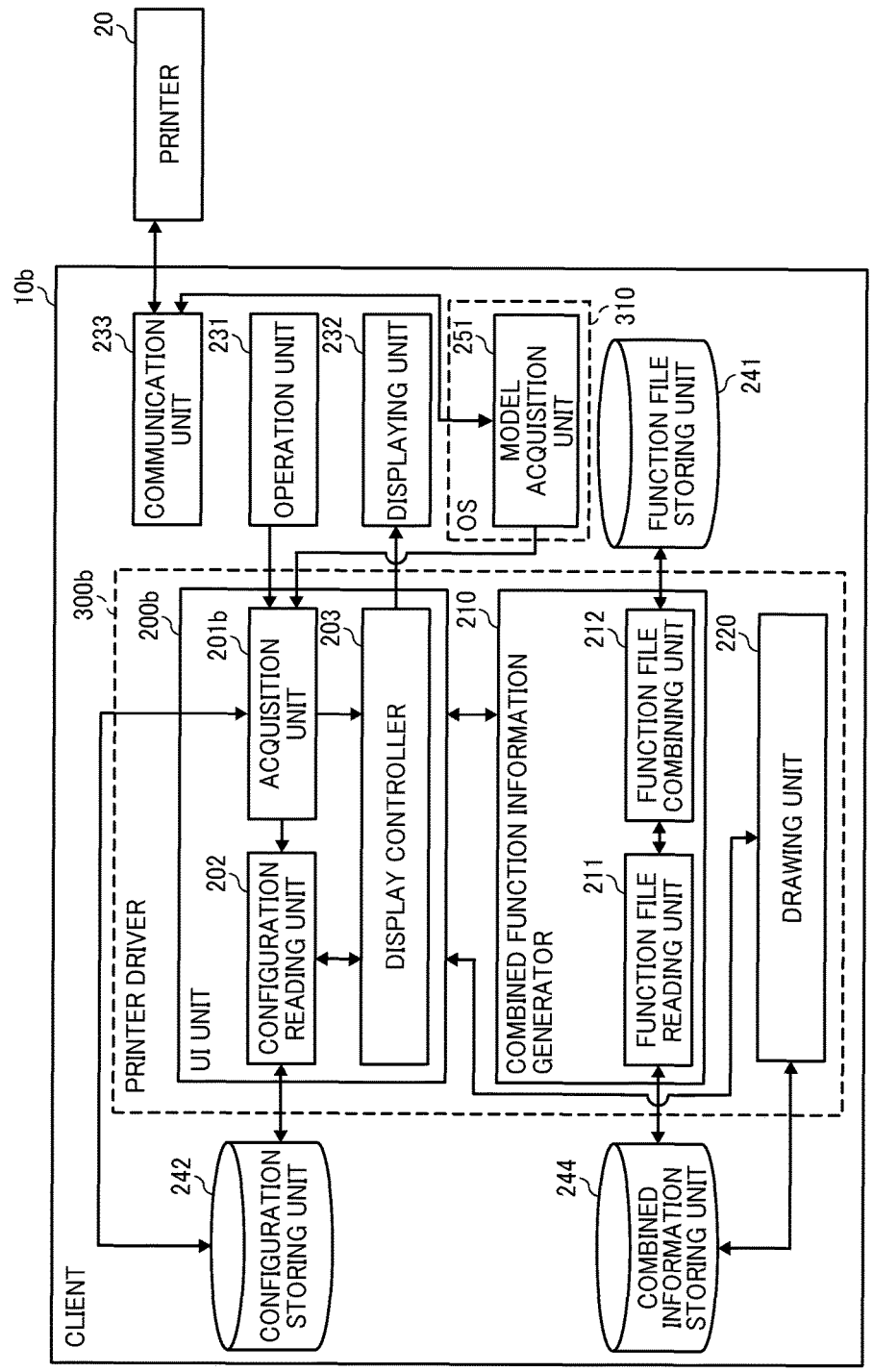
FIG. 15 is a block diagram illustrating a functional configuration of the client as an embodiment of the present invention.

FIG. 15 is a block diagram illustrating a functional configuration of the client in this embodiment. A functional configuration of the client 10b in this embodiment is described below with reference to FIG. 15.

As illustrated in FIG. 15, a printer driver 300b as a model common driver and an OS 310 are installed in the client 10b. Furthermore, the client 10b includes an operation unit 231, a displaying unit 232, a communication unit 233, a function file storing unit 241 (a first storing unit), a configuration storing unit 242, and a combined information storing unit 244.

As illustrated in FIG. 15, by executing by the CPU 101, functional units such as a UI unit 200b, a combined function information generator 210, and a drawing unit 220 are implemented in the printer driver 300b. In addition, the printer driver 300b includes function files defining functions included in a printer (such as the model common function file and the model specific function file) as a package. Here, the functions of the drawing unit 220, the operation unit 231, the displaying unit 232, and the function file storing unit 241 are similar to the functions described in the first embodiment.

The UI unit 200b is a functional unit that displays a configuration screen for printing and acquiring operation information input on the configuration screen using the operation unit 231 and information transferred by the printer 20 etc. The UI unit 200b includes an acquisition unit 201b, a configuration reading unit 202, and a display controller 203.

The acquisition unit 201b is a functional unit that acquires operation information input on the operation unit 231 by user operation and information transferred by the printer 20 etc. For example, the acquisition unit 201b is implemented by a program (i.e., the printer driver 300b) executed by the CPU 101 in FIG. 2.

The configuration reading unit 202 is a functional unit for reading information on the model name configured as the printer 20 currently used from the configuration storing unit 242 and transferring the information on the model name to the combined function information generator 210. For example, the configuration reading unit 202 is implemented by a program (i.e., the printer driver 300b) executed by the CPU 101 in FIG. 2.

The display controller 203 is a functional unit for controlling a displaying operation of the displaying unit 232. For example, the display controller 203 is implemented by a program (i.e., the printer driver 300b) executed by the CPU 101 in FIG. 2.

The combined function information generator 210 is a functional unit for generating a combined function file by combining a model specific function file defining functions specific to the model of each printer 20 with a model common function file defining functions that most printers include in common. It should be noted that the combining operation of the combined function file is similar to the operation described in the first embodiment. The combined function information generator 210 includes a function file reading unit 211 (a reading unit) and a function file combining unit 212 (a combining unit). Here, the functions of the function file reading unit 211 and the function file combining unit 212 are similar to the functions described in the first embodiment.

The OS 310 is an operating software that controls operations of various programs installed in the client 10b. By executing the OS 310 by the CPU 101, for example, the function of the model acquisition unit 251 may be implemented as illustrated in FIG. 15.

The model acquisition unit 251 is a functional unit for acquiring information on the model name from the printer 20 via the communication unit 233. Here, the model acquisition unit 251 is implemented by a program (i,e., the OS 310) executed by the CPU 101 in FIG. 2.

The communication unit 233 is a functional unit for performing data communication with the printer 20 via the network 30. The communication unit 233 is implemented by the communication I/F 104 illustrated in FIG. 2.

The configuration storing unit 242 is a functional unit for storing configuration information for printing and information on the model name configured as the printer 20 currently used etc. For example, the configuration storing unit 242 is implemented by the auxiliary storage device 108 in FIG. 2.

The combined information storing unit 244 is a functional unit that stores the combined function information including at least the combined function file combining the model specific function file with the model common function file by the function file combining unit 212. For example, the combined information storing unit 244 is implemented by the auxiliary storage device 108 in FIG. 2.

In the above description, the acquisition unit 201b, the configuration reading unit 202, the display controller 203, the function file reading unit 211a, the function file combining unit 212, and the drawing unit 220 are implemented by programs as software. However, the acquisition unit 201, the configuration reading unit 202, the display controller 203, the function file reading unit 211, the function file combining unit 212, and the drawing unit 220 may also be implemented by hardware circuitry such as FPGA and ASIC etc.

In addition, the functional units in FIG. 15 are functions illustrated conceptually, and configurations of the functional units in FIG. 15 are not limited to that. For example, multiple functional units separately illustrated in FIG. 15 may be implemented as one functional unit. By contrast, functions included in one functional unit in FIG. 15 may be divided into multiple functions and implemented as multiple functional units. In addition, in this embodiment, functional units implemented by the printer driver 300b in FIG. 15 are implemented by executing one program as software. However, the configuration of those functional units is not limited to that, and those functional units may be implemented by executing multiple software programs. For example, among functional units included in the printer driver 300b, the UI unit 200b and the combined function information generator 210 may be implemented separately from the drawing unit 220 by executing separate software programs respectively.

Figure 16:
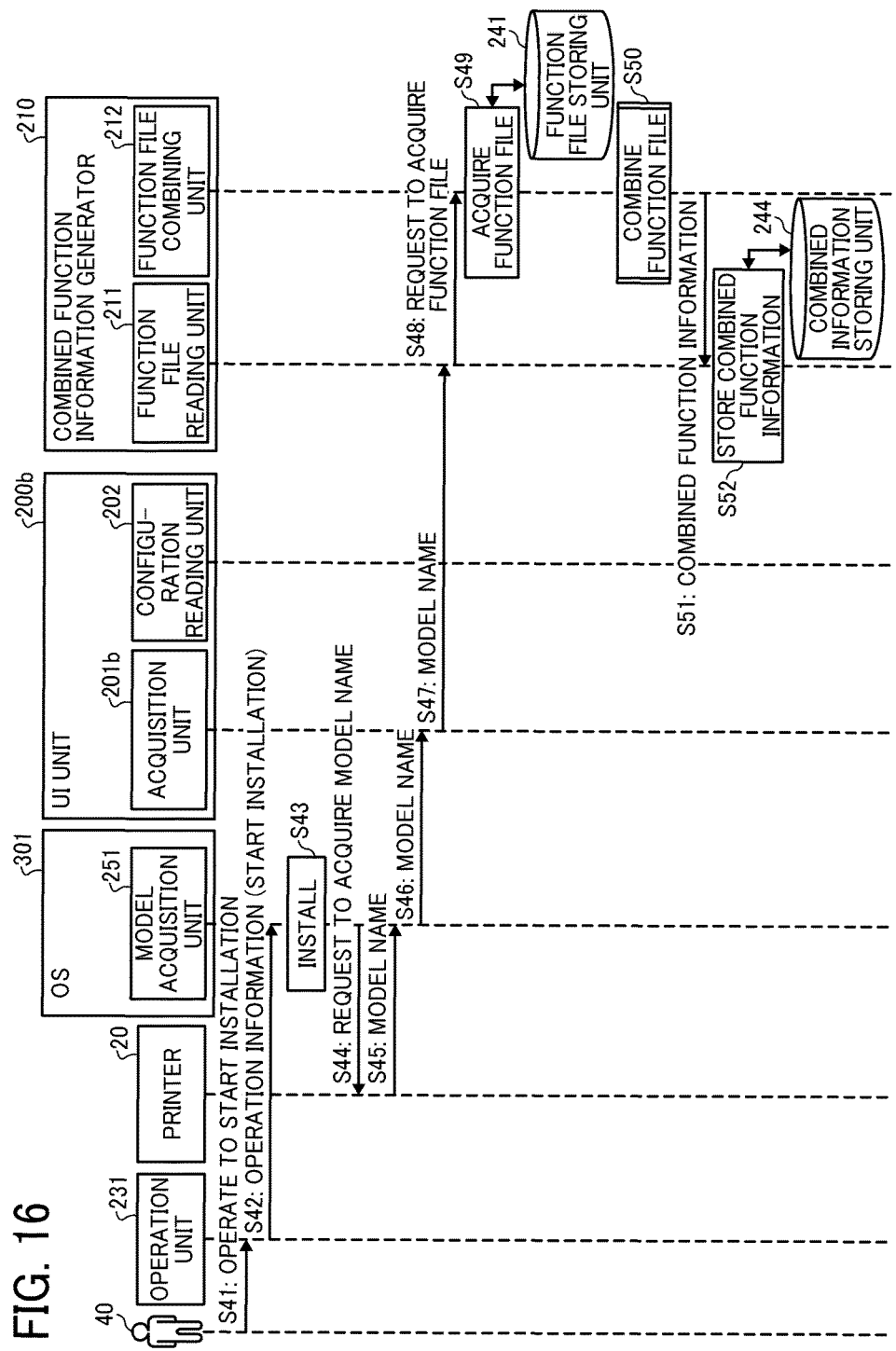
FIG. 16 is a sequence chart illustrating an operation of installing a driver performed by the client as an embodiment of the present invention.

FIG. 16 is a sequence chart illustrating an operation of installing a driver performed by the client in this embodiment. With reference to FIG. 16, an operation of installing a printer driver on the client 10b in this embodiment is described below. That is, when the operation illustrated in FIG. 16 is started, it is assumed that the printer driver 300b has not been installed yet.

In S41, the user 40 performs an operation of installing the printer driver 300b on the operation unit 231.

In S42, the operation unit 231 transfers operation information for installing the printer driver 300b input by user operation by the user 40 to the OS 310.

In S43, the OS 310 installs the printer driver 300b.

For example, the OS 310 installs the printer driver 300b using a graphical user interface (GUI) function. As a result, functions of the UI unit 200b, the combined function information generator 210, and the drawing unit 220 in the printer driver 300b may be performed. It should be noted that the installation of the printer driver 300b may be performed by an executable file such as an installer etc.

In S44, the model acquisition unit 251 in the OS 310 transfers a request to acquire the model name of the printer 20 via the communication unit 233.

In S45, after receiving the request to acquire model name, the printer 20 transfers information on its own model name to the model acquisition unit 251.

In S46, the model acquisition unit 251 transfers the received information on the model name to the acquisition unit 201b in the unit 200b.

In S47, the acquisition unit 201b transfers the information on the model name of the printer 20 to the function file reading unit 211 in the combined function information generator 210.

Operations in steps S48 to S51 are similar to the operations in steps S21 to S24 illustrated in FIG. 4B respectively.

In S52, the function file reading unit 211 stores the combined function information (the combined function file) received from the function file combining unit 212 in the combined information storing unit 244.

By performing the operation in steps S41 to S52 described above, the operation of combining function files is performed in installing the printer driver in the client 10b. Here, in the operation illustrated in FIG. 16, the model acquisition unit 251 in the OS 310 acquires the model name from the printer 20. However, the configuration is not limited to that, and the model name may be acquired by the function of the installed printer driver 300b.

Figure 17:
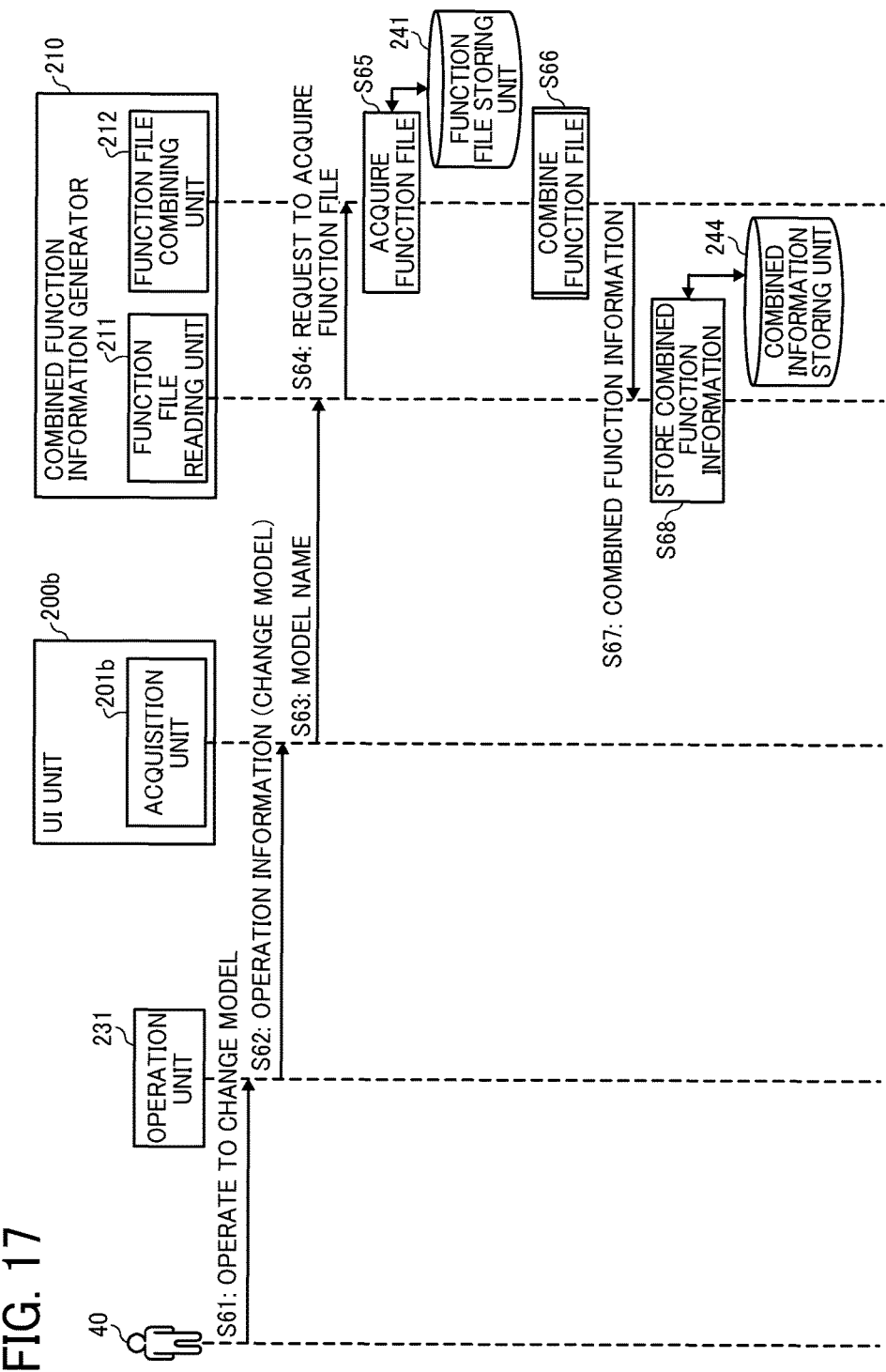
FIG. 17 is a sequence chart illustrating an operation of changing a model on the property screen performed by the client as an embodiment of the present invention.
Figure 18:
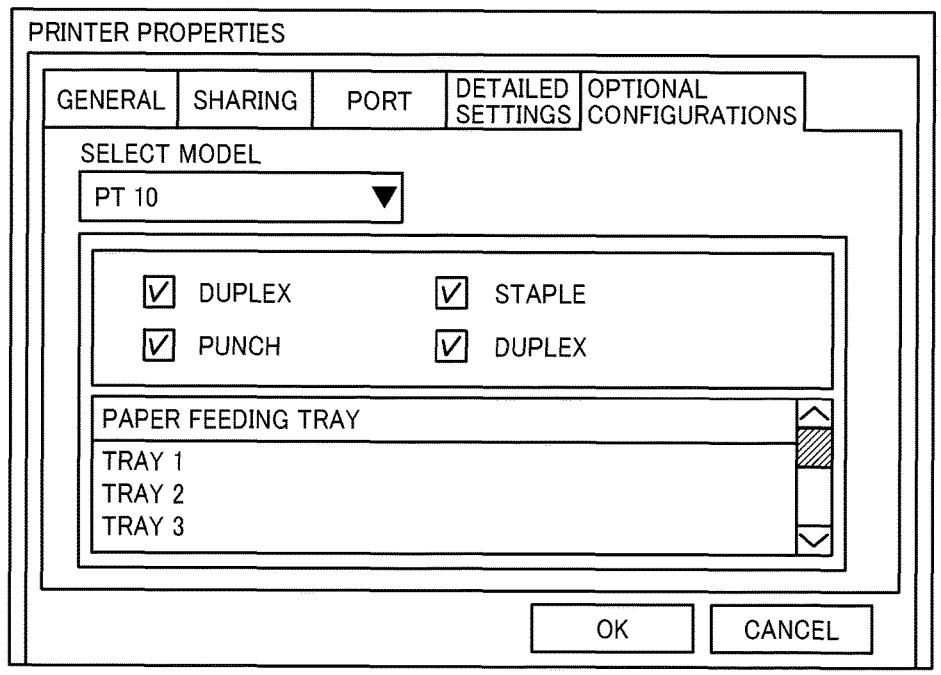
FIG. 18 is a diagram illustrating the printer property screen as an embodiment of the present invention.
Figure 19:
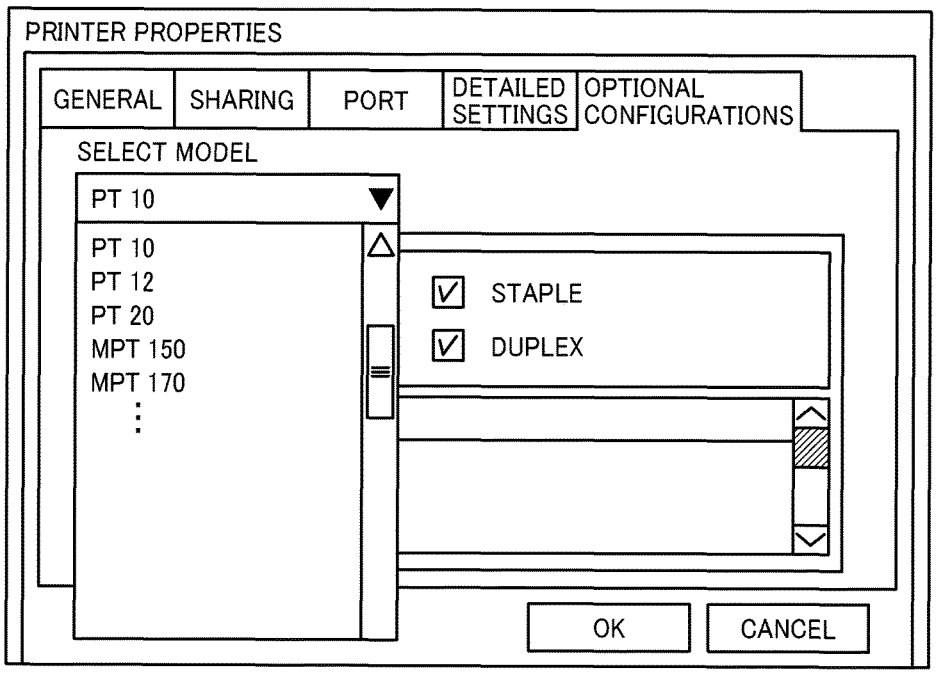
FIG. 19 is a diagram illustrating an operation of changing a printer model on the printer property screen as an embodiment of the present invention.

FIG. 17 is a sequence chart illustrating an operation of changing a model on the property screen performed by the client in this embodiment. FIG. 18 is a diagram illustrating the printer property screen in this embodiment. FIG. 19 is a diagram illustrating an operation of changing a printer model on the printer property screen in this embodiment. With reference to FIGS. 17 to 19, an operation of changing a printer model on the property screen on the client 10b in this embodiment is described below.

In S61, it is assumed that a property screen of the printer 20 as illustrated in FIG. 18 is displayed on the displaying unit 232.

After performing a pull-down operation for selecting model on the property screen in FIG. 18 on the operation unit 231 by the user 40, for example, a list of models is displayed using a pull-down way as illustrated in FIG. 19. Subsequently, in order to switch model, the user 40 performs an operation of selecting a model name of a printer that the user intends to configure print settings and execute printing from the printer model names displayed using the pull-down way on the operation unit 231.

For example, the list of models displayed in the pull-down way may be implemented by the operations in steps S14 to S16 in the sequence chart illustrated in FIG. 4A described above.

In S62, the operation unit 231 transfers operation information specifying the model name of the printer selected on the property screen by user operation by user 40 to the acquisition unit 201b.

In S63, after acquiring (receiving) the operation information specifying the printer model name, the acquisition unit 201b transfers information on the model name specified by the operation information to the function file reading unit 211 in the combined function information generator 210.

Operations in steps S64 to S67 are similar to the operations in steps S21 to S24 illustrated in FIGS. 4A and 4B respectively.

In S68, the function file reading unit 211 stores the combined function information (the combined function file) received from the function file combining unit 212 in the combined information storing unit 244.

In addition, the acquisition unit 201b stores the changed information on the model name in the configuration storing unit 242.

Figure 20B:
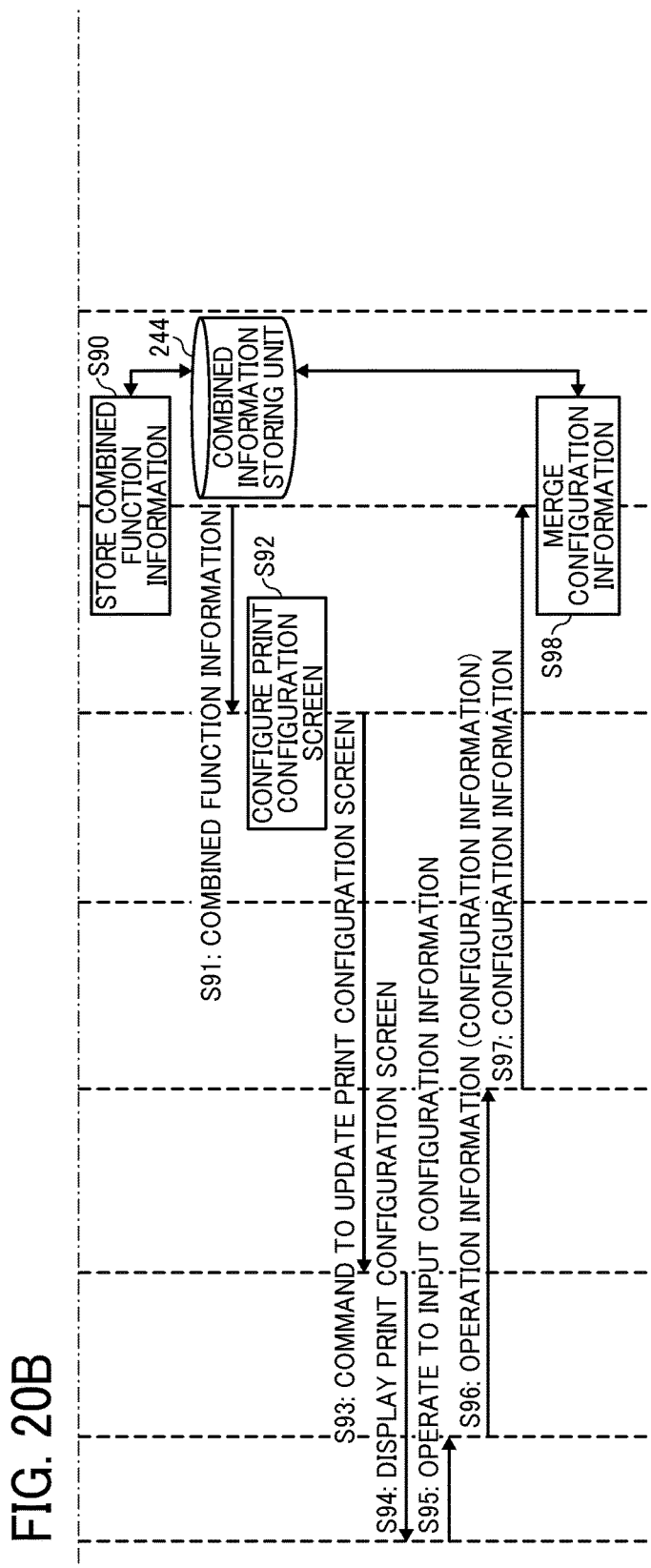
Figures 21, 22, 23, 24:
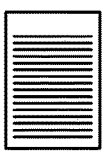
FIG. 21 is a diagram illustrating a print configuration screen as an example embodiment of the present invention.
FIG. 22 is a diagram illustrating a UI for selecting a selectable item among setting items as an embodiment of the present invention.
FIG. 23 is a diagram illustrating a UI for configuring a configured range among setting items as an embodiment of the present invention.
FIG. 24 is a diagram illustrating a UI for configuring an available character among setting items as an embodiment of the present invention.

By performing the operation in steps S61 to S68 described above, the operation of combining function tiles is performed in changing the model on the property screen on the client FIGS. 20A and 20B are sequence diagrams illustrating an operation of displaying a print configuration screen on the client in this embodiment. FIG. 21 is a diagram illustrating a print configuration screen in this embodiment. FIG. 22 is a diagram illustrating a UI for selecting a selectable item among setting items in this embodiment. FIG. 23 is a diagram illustrating a UI for configuring a configured range among setting items in this embodiment. FIG. 24 is a diagram illustrating a UI fur configuring an available character among setting items in this embodiment. With reference to FIGS. 20 to 24, an operation of displaying the print configuration screen on the client 10b in this embodiment is described below.

In S81, the displaying unit 232 displays the print configuration screen in response to an operation by a user 40 on the operation unit 231.

In S82, the operation unit 231 transfers operation information indicating a request to display the print configuration screen input by user operation by user 40 to the acquisition unit 201b of the UI unit 200b.

In S83, after acquiring (receiving) the operation information indicating the request to display the print configuration screen, the acquisition unit 201b transfers the request to display the print configuration screen to the configuration reading unit 202.

In S84, after receiving the request to display the print configuration screen, the configuration reading unit 202 reads information on the model name configured as the printer 20 currently used from the configuration storing unit 242.

In S85, the configuration reading unit 202 transfers the read information on the model name to the function file reading unit 211 in the combined function information generator 210.

Operations in steps S86 to S89 are similar to the operations in steps S21 to S24 illustrated in FIGS. 4A and 4B respectively.

In S90, the function file reading unit 211 stores the combined function information (the combined function file) received from the function file combining unit 212 in the combined information storing unit 244.

In S91, the function file reading unit 211 transfers the combined function information to the display controller 203 in the UI unit 200b.

In S92, after receiving the combined function information, the display controller 203 configures the print configuration screen based on the function names and setting items defined in the combined function information.

In S93, the display controller 203 transfers a command to update print configuration screen along with information on the reconfigured print configuration screen to the displaying unit 232.

In S94, after receiving the information on the configured print configuration screen and the command to update print configuration screen, the displaying unit 232 updates the print configuration screen and displays the updated print configuration screen for the user 40.

For example, the displaying unit 232 displays the print configuration screen as illustrated in FIG. 21 as the print configuration screen configured based on the model name and the setting items defined in the combined function information, in the print configuration screen in FIG. 21, function names "Paper Size", "Paper Type", "Document Orientation", "Paper Feeding Tray", "Duplex", "Staple", "Punch", "Color/Black & White", and "Number of Copies" are defined in the combined function information. These function names are displayed on the screen, and it is possible to select or input setting items corresponding to the function names respectively.

In S95, the user 40 confirms the configured print configuration screen displayed on the displaying unit 232 and performs an operation of inputting print setting information on the operation unit 231.

For example, on the configured print setting screen, a UI for selecting setting items corresponding to the function name "Color/Black & White" is illustrated in FIG. 22. In the UI illustrated in FIG. 22, the setting items are the selection items, and it is possible to select either one of selection items "Color" and "Black & White" displayed in pull-down manner. In addition, on the configured print setting screen, a UI for configuring setting items corresponding to the function name "Number of Copies" is illustrated in FIG. 23. In the UI illustrated in FIG. 23, the setting item is the setting range, and it is possible to configure an intended number of copies within a setting range 1 to 999. In addition, on the configured print setting screen, a UI for inputting setting items corresponding to the function name "User ID" is illustrated in FIG. 24. In the UI illustrated in FIG. 24, the setting item is an acceptable character, and it is possible to input characters a to z, A to Z, 0 to 9, "_", "•", "-", "/", and ".".

In S96, the operation unit 231 transfers operation information including the print setting information input on the configuration screen by user operation by the user 40 to the acquisition unit 201b.

In S97, after acquiring (receiving) the operation information including the print setting information, the acquisition unit 201b transfers the print setting information included in the operation information to the function file reading unit 211 in the combined function information generator 210.

In S98, the function file reading unit 211 merges the received print setting information with the combined function information (i.e., the combined function file actually) stored in the combined information storing unit 244 and stores (updates) the merged information as new combined function information in the combined information storing unit 244.

By performing the operation in steps S81 to S98 described above, the operation of combining function files is performed in displaying the print configuration screen on the client 10b.

It should be noted that the print configuration screen may be opened instead of selecting the model name on the property screen illustrated in FIGS. 18 and 19 described above. In this case, the model name for displaying the print settings is not fixed. Therefore, for example, it is possible to generate the combined function file using an initial value of the model name. Otherwise, the model name may be acquired from the printer 20 using the function of the model acquisition unit 251 to generate the combined function file using the acquired model name.

In addition, for example, after selecting the model name on the property screen in FIG. 18, if the printer 20 different from the selected model name is connected and the print configuration screen in FIG. 21 is opened, the model acquisition unit 251 may acquire information on the model name from the newly connected printer 20 and transfers the acquired information to the function file reading unit 211 in the combined function information generator 210. Subsequently, the operations in steps S86 to S98 illustrated in FIGS. 20A and 20B may be performed.

As described above, the function file storing unit 241 stores the model specific function file defining functions specific to the model of each printer 20 and the model common function file defining functions that most printers include in common. In addition, for example, in case of installing the printer driver by user operation, changing the model on the property screen, and displaying the print configuration screen, the combined function information generator 210 generates the combined function file by merging the model specific function file corresponding to the model selected by user operation with the model common function file. As a result, it is unnecessary that all functions and setting items used in the model are defined in the model specific function file, and it is required to define functions and setting items not defined in the model common function file or different from the model common function file in the model specific function file. Consequently, compared to the case that all function and setting items used in the model are defined, it is possible to reduce data size of the model specific function file. Therefore, it is possible to provide a printer driver that may prevent data size of the entire multiple function files (i.e., the model specific function file and the model common function file) from being increased. For example, this embodiment may be applied to the V4 driver as the printer driver described above.

Variation

Regarding a client 10c in a variation of the second embodiment, points different from the client 10b in the second embodiment are mainly described below. In the variation, in combining a model specific function file specific to a model with the model common function file, if the combined information file corresponding to the model already exists, an operation of skipping the combining operation is described below. It should be noted that the entire configuration of the information processing system and the hardware configuration of the client 10c in this variation is similar to the configuration illustrated in FIGS. 1 and 2.

Figure 25:
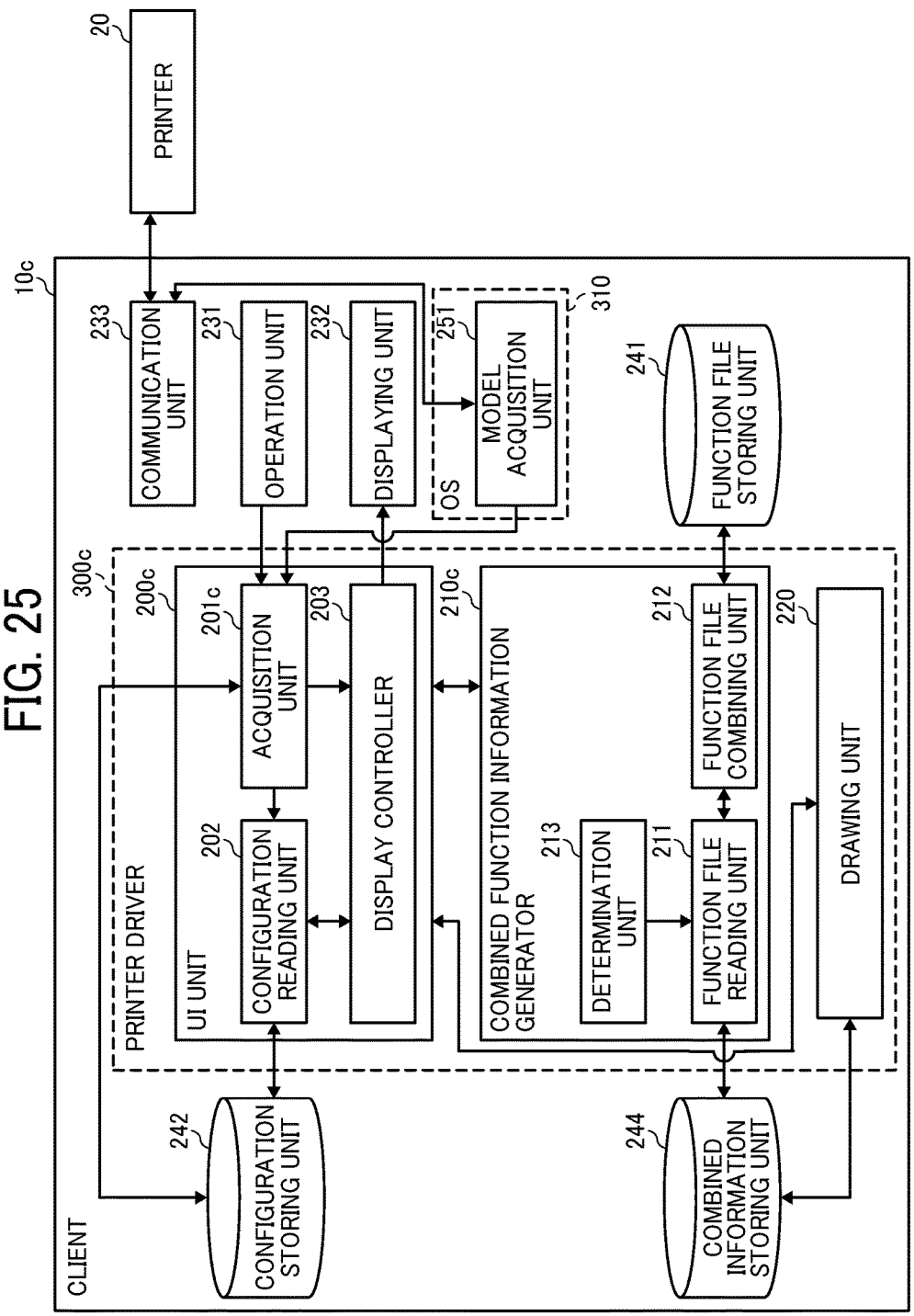
FIG. 25 is a block diagram illustrating a functional configuration of the client as an embodiment of the present invention.

FIG. 25 is a block diagram illustrating a functional configuration of the client in this variation. A functional configuration of the client 10c in this variation is described below with reference to FIG. 25.

As illustrated in FIG. 25, a printer driver 300c as a model common driver and an OS 310 are installed in the client 10c. Furthermore, the client 10c includes an operation unit 231, a displaying unit 232, a communication unit 233, a function file storing unit 241 (a first storing unit), a configuration storing unit 242, and a combined information storing unit 244 (a second storing unit).

As illustrated in FIG. 25, by executing by the CPU 101, functional units such as a UI unit 200c, a combined function information generator 210c, and a drawing unit 220 are implemented in the printer driver 300c. In addition, the printer driver 300c includes function files defining functions included in a printer (such as the model common function file and the model specific function file) as a package. Here, the functions of the drawing unit 220, the operation unit 231, the displaying unit 232, the communication unit 233, the function file storing unit 241, the configuration storing unit 242, and the combined information storing unit 244 are similar to the functions described in the second embodiment.

The UI unit 200c is a functional unit that displays a configuration screen for printing and acquiring operation information input on the configuration screen using the operation unit 231 and information transferred by the printer 20 etc. The UI unit 200c includes an acquisition unit 201c (an example of an acquisition unit), a configuration reading unit 202 (an example of an acquisition unit), and a display controller 203. Here, functions of the acquisition unit 201c, the configuration reading unit 202, and the display controller 203 in the UI unit 200c are similar to the functions of the acquisition unit 201b, the configuration reading unit 202, and the display controller 203 in the UI unit 200b in FIG. 15.

The combined function information generator 210c is a functional unit for generating a combined function file by combining a model specific function file defining functions specific to the model of each printer 20 with a model common function file defining functions that most printers include in common. It should be noted that the combining operation of the combined function file is similar to the operation described in the first embodiment. The combined function information generator 210c includes a function file reading unit 211 (a reading unit, a storing controller), a function file combining unit 212 (a combining unit), and a determination unit (a determining unit) 213. Here, the functions of the function file reading unit 211 and the function file combining unit 212 are similar to the functions described in the first embodiment.

The determination unit 213 is a functional unit fur determining whether or not combined function information corresponding to a specific model name (a combined function file in this case) has already been stored in the combined information storing unit 244. For example, the determination unit 213 is implemented by a program (i.e., the printer driver 300c) executed by the CPU 101 in FIG. 2.

The OS 310 is an operating software that controls operations of various programs installed in the client 10c. By executing the OS 310 by the CPU 101, for example, the function of the model acquisition unit 251 may be implemented as illustrated in FIG. 25. It should be noted that the function of the model acquisition unit 251 is similar to the function of the model acquisition unit 251 illustrated in FIG. 15.

In the above description, the acquisition unit 201c, the configuration reading unit 202, the display controller 203, the function file reading unit 211a, the function file combining unit 212, the determination unit 213, and the drawing unit 220 are implemented by programs as software. However, the acquisition unit 201, the configuration reading unit 202, the display controller 203, the function file reading unit 211, the function file combining unit 212, the determination unit 213, and the drawing unit 220 may also be implemented by hardware circuitry such as FPGA and ASIC etc.

In addition, the functional units in FIG. 25 are functions illustrated conceptually, and configurations of the functional units in FIG. 25 are not limited to that. For example, multiple functional units separately illustrated in FIG. 25 may be implemented as one functional unit. By contrast, functions included in one functional unit in FIG. 25 may be divided into multiple functions and implemented as multiple functional units. In addition, in this embodiment, functional units implemented by the printer driver 300c illustrated in FIG. 25 are implemented by executing one program as software. However, the configuration of those functional units is not limited to that, and those functional units may be implemented by executing multiple software programs. For example, among functional units included in the printer driver 300c, the UI unit 200c and the combined function information generator 210c may be implemented separately from the drawing unit 220 by executing separate software programs respectively.

FIG. 26 is a sequence chart illustrating an operation of changing a model on the property screen performed by the client in this variation. With reference to FIG. 26, an operation of changing a printer model on the property screen on the client 10c in this variation is described below.

Operations in steps S61 to S63 are similar to the operations in steps S61 to S63 illustrated in FIG. 17 respectively.

In S63-1, the function file reading unit 211 transfers the received information on the model name to the determination unit 213.

In S63-2, the determination unit 213 determines whether or not combined function information corresponding to the received model name (a combined function file in this case) has already been stored in the combined information storing unit 244.

In S63-3, the determination unit 213 transfers the determination result to the function file reading unit 211.

If the determination result indicates that the combined function information (the combined function file) corresponding to the model name received by the determination unit 213 is stored in the combined information storing unit 244, operations in steps S64 to S68 are skipped, and the operation ends without generating the new combined function file. If the determination result indicates that the combined function information (the combined function file) corresponding to the model name received by the determination unit 213 is not stored in the combined information storing unit 244, the operation proceeds to step S64.

Operations in steps S64 to S68 are similar to the operations in steps S64 to S68 illustrated in FIG. 17 respectively.

By performing the operation in steps S61 to S68 described above, the operation of combining function files is performed in changing the model on the property screen on the client 10c.

Figure 27A:
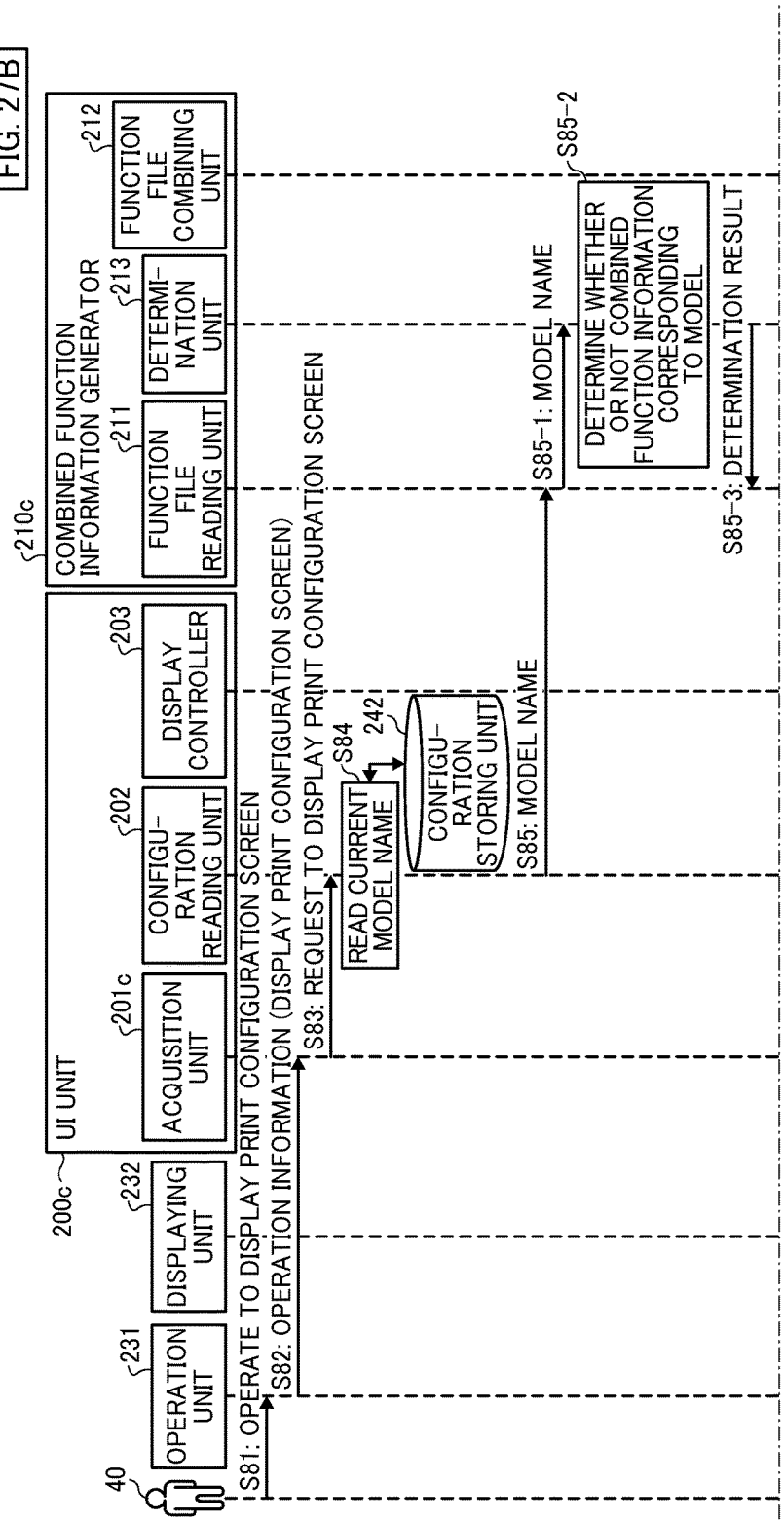
FIGS. 27A and 27B are sequence charts illustrating an operation of displaying a print configuration screen on the client as an embodiment of the present invention.
Figure 27B:
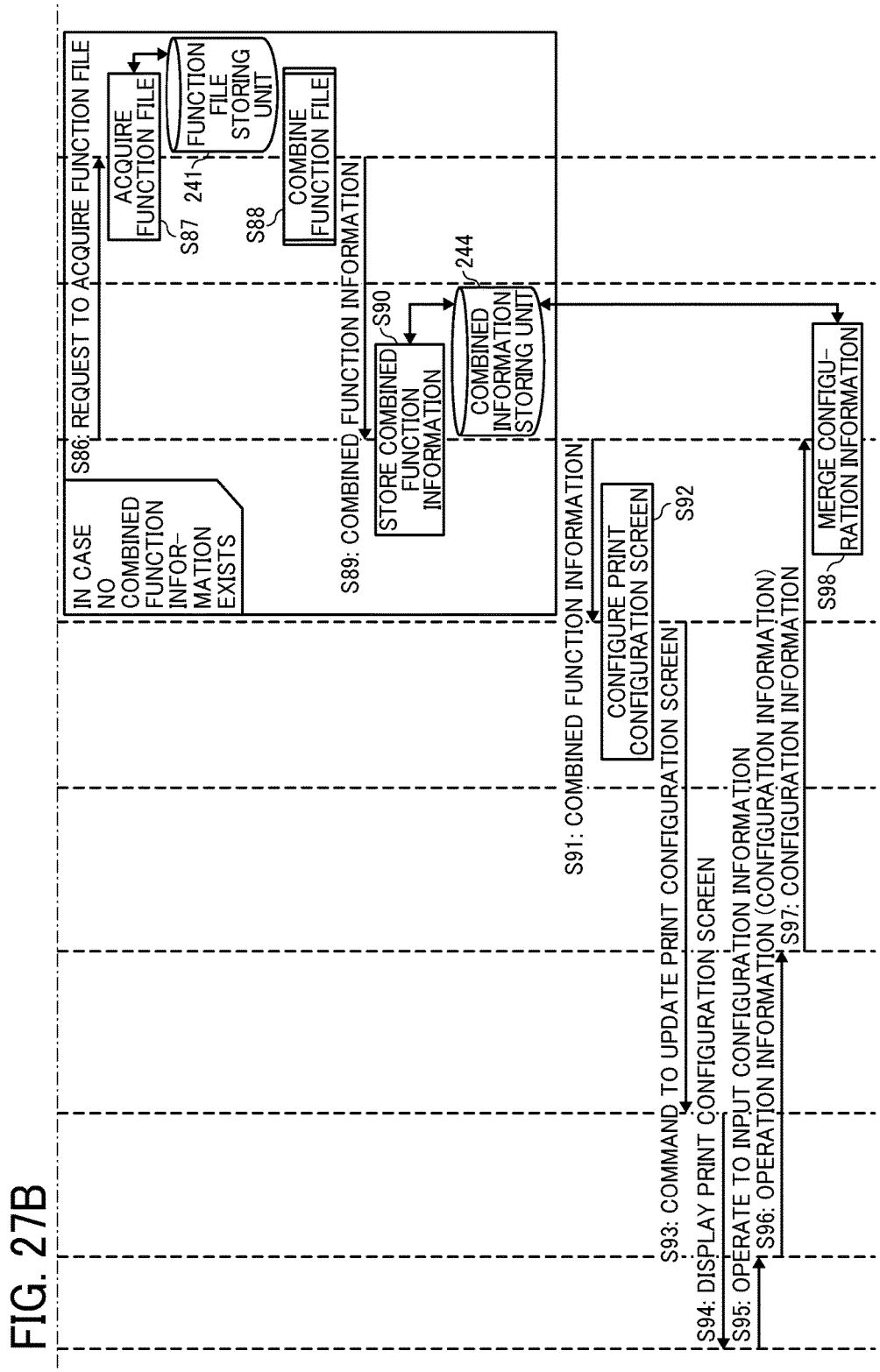

FIGS. 27A and 27B are sequence charts illustrating an operation of displaying a print configuration screen on the client in this variation. With reference to FIGS. 27A and 27B, an operation of displaying the print configuration screen on the client 10c in this embodiment is described below.

Operations in steps S81 to S85 are similar to the operations in steps S81 to S85 illustrated in FIG. 20A respectively.

In S85-1, the function file reading unit 211 transfers the received information on the model name to the determination unit 213.

In S85-2, the determination unit 213 determines whether or not combined function information corresponding to the received model name (a combined function file in this case) has already been stored in the combined information storing unit 244.

In S85-3, the determination unit 213 transfers the determination result to the function file reading unit 211.

If the determination result indicates that the combined function information (the combined function file) corresponding to the model name received by the determination unit 213 is stored in the combined information storing unit 244, operations in steps S86 to S90 are skipped, and the operation proceeds to step S91 without generating the new combined function file. If the determination result indicates that the combined function information (the combined function file) corresponding to the model name received by the determination unit 213 is not stored in the combined information storing unit 244, the operation proceeds to step S87.

Operations in steps S86 to S90 are similar to the operations in steps S86 to S90 illustrated in FIGS. 20A and 20B respectively.

Operations in steps S91 to S98 are similar to the operations in steps S91 to S98 illustrated in FIG. 20B respectively.

By performing the operation in steps S81 to S98 described above, the operation of combining function files is performed in displaying the print configuration screen on the client 10c.

As described above in this variation, if the combined function information (combined function file) corresponding to the specific model name is stored in the combined information storing unit 244, that is, the combining operation has already been performed, it is unnecessary to generate the combined function file newly by merging the model specific function file with the model common function file, so the combining operation is skipped. As a result, it is possible to prevent processing load from increasing by performing unnecessary operations. For example, in case of displaying the print configuration screen, if the combined function information corresponding to the model name currently used exists, it is unnecessary to perform the combining operation newly. Therefore, it is possible to display the print configuration screen quickly.

It should be noted that, regarding the operation of displaying the print configuration screen on the client 10b in the second embodiment and the client 10c in the variation of the second embodiment, the operation that the displaying order for setting items of each function displayed on the configured screen is regarded as the order corresponding to the priorities specified in the displaying order file described in the variation of the first embodiment may be performed.

It should also be noted that, in the embodiments and the variations described above, if at least any one of the functional units included in the client 10 (10a to 10c) is implemented by executing a program, the program is provided installed in the ROM etc. preliminarily. The program executed on the client 10 (10a to 10c) in the embodiments and the variation described above may be provided by being stored in a computer readable, recording medium, such as a compact disc read only memory (CD-ROM), a flexible disk (FD), a compact disc recordable (CD-R), and a digital versatile disc (DVD) etc., in a file format installable or executable. In addition, the program executed by the client 10 (10a to 10c) in the embodiments and the variations described above may be stored in a computer connected to a network such as the Internet etc., and the program may be provided by downloading the program via the network. Furthermore, it is possible to provide and distribute the program executed by the client 10 (10a to 10c) in the embodiments and the variations described above via the network such as the Internet etc. In addition, the program executed by the client 10 (10a to 10c) in the embodiments and the variations described above includes a module structure including at least any one of the functional units described above. As actual hardware, the CPU 101 reads the program from the storage device described above (e.g., the ROM 102 or the auxiliary storage device 108) and executes the program, and the functional units described above are loaded on the main storage device (e.g., the RAM 103) and generated.

The embodiments and the variations described above provide an information processing apparatus that may prevent the data size of the entire multiple function files stored in the model common driver from increasing.

It should be noted that the case that the computer apparatus reads and executes the program code is just one example to implement the functional units in the embodiments described above. In addition, in accordance with instructions by the program code, an operating system (OS) running on the computer apparatus may perform a part of the operations or all operations. Furthermore, the functional units described in the above embodiments may obviously be implemented by performing those operations.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:
a first memory storing computer-readable instructions; and
one or more processors configured to execute the computer-readable instructions such that the one or more processors are configured to perform operations including,
reading, from the first memory, a model common function file defining one or more common functions that are common to a majority of a plurality of models of image forming apparatuses stored in the memory and one or more setting items corresponding to the common function, and reading at least one model specific function file defining a function specific to a selected one of the plurality of models of the image forming apparatus and setting items corresponding to the model specific function;
combining the model common function file with the model specific function file to generate a combined function file; and
selecting, among the setting items of the function defined in the model specific function file, one or more settings items each setting item having two or more unselectable values, and overwriting the selected setting items in the combined function file with corresponding setting items defined in the model common function file.

2. The information processing apparatus according to claim 1,
wherein, in generating the combined function file, the one or more processors are configured to perform at least one of adding, overwriting, and deleting on information regarding at least one of the functions defined in the model specific function file, the information including at least one of the function and the setting items of the function.

3. The information processing apparatus according to claim 1,
wherein the one or more processors are configured to perform:
generating, based on the combined function file, a print configuration screen for the image forming apparatus that requests the print configuration screen; and
displays the print configuration screen on a display.

4. The information processing apparatus according to claim 3,
wherein the one or more processors are configured to perform:
reading, from a third memory, a displaying order file indicating a priority order in displaying the setting items of each function of the image forming apparatus; and
reconfiguring the print configuration screen so that the setting items of each function displayed on the print configuration screen are laid out in accordance with the priority order.

5. The information processing apparatus according to claim 1,
wherein, when deletion is specified in at least one of the function and the setting items of the function defined in the model specific function file, the one or more processors are configured to perform deleting the function or the setting items of the function to be deleted from the model common function file.

6. The information processing apparatus according to claim 1,
wherein, when at least one of the function and the setting items of the function defined in the model specific function file is not defined in the model common function file, the one or more processors are configured to perform adding the function or the setting items of the function that is not defined to the model common function file.

7. The information processing apparatus according to claim 1,
wherein the one or more processors are configured to perform:
acquiring a model name of one of the plurality of models of the image forming apparatus; and
reading one of the model specific function files corresponding to the model name being acquired from the first memory.

8. The information processing apparatus according to claim 1, further comprising:
a second memory to store at least one combined function file,
wherein the one or more processors are configured to perform:
acquiring a model name of one of the plurality of models of the image forming apparatus;
determining whether or not the combined function file corresponding to the model name being acquired matches the at least one combined function file stored in the second memory; and
based on a determination that the combined function file corresponding to the model name being acquired matches the stored combined function file, cancelling generation of the combined function file by combining the model common function file with the model specific function file corresponding to the model name.

9. An information processing system, comprising:
the information processing apparatus according to claim 1; and
one or more image forming apparatuses connected to the information processing apparatus,
wherein the one or more processors of the information processing apparatus are configured to perform
converting print information into converted information based on the combined function file being generated, and
transferring the converted information to at least one of the image forming apparatuses, to cause the at least one image forming apparatus to form an image based on the converted information received from the information processing apparatus.

10. A method of processing information performed by an information processing apparatus, the method comprising:
reading, from a first memory, a model common function file defining one or more common functions that are common to a majority of a plurality of models of an image forming apparatus and one or more setting items corresponding to the common function,
reading, from the first memory, one or more model specific function file defining a function specific to one of the plurality of models of the image forming apparatus and setting items corresponding to the model specific function;
combining the model common function file with the model specific function file to generate a combined function file; and
selecting, among the setting items of the function defined in the model specific function file, one or more settings items each setting item having two or more unselectable values, and overwriting the selected setting items in the combined function file with corresponding setting items defined in the model common function file.

11. A non-transitory, computer-readable recording medium storing a program that, when executed by one or more processors of an information processing apparatus, causes the processors to implement a method of processing information, comprising:
reading, from a first memory, a model common function file defining one or more common functions that are common to a majority of a plurality of models of an image forming apparatus and one or more setting items corresponding to the common function
reading, from the first memory, one or more model specific function file defining a function specific to one of the plurality of models of the image forming apparatus and setting items corresponding to the model specific function;
combining the model common function file with the model specific function file to generate a combined function file; and
selecting, among the setting items of the function defined in the model specific function file, one or more settings items each setting item having two or more unselectable values, and overwriting the selected setting items in the combined function file with corresponding setting items defined in the model common function file.

* * * * *